(12) United States Patent
Inada

(10) Patent No.: US 11,682,339 B2
(45) Date of Patent: Jun. 20, 2023

(54) VEHICLE DISPLAY CONTROL APPARATUS AND VEHICLE DISPLAY CONTROL SYSTEM

(71) Applicant: TOYOTA JIDOSHA KABUSHIKI KAISHA, Aichi-ken (JP)

(72) Inventor: Tomohiro Inada, Kariya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/701,100

(22) Filed: Mar. 22, 2022

(65) Prior Publication Data

US 2022/0375391 A1 Nov. 24, 2022

(30) Foreign Application Priority Data

May 12, 2021 (JP) .............................. JP2021-080799

(51) Int. Cl.
*B60K 35/00* (2006.01)
*G09G 3/20* (2006.01)
*G06T 7/70* (2017.01)
*G06V 20/58* (2022.01)

(52) U.S. Cl.
CPC ........... *G09G 3/2092* (2013.01); *B60K 35/00* (2013.01); *G06T 7/70* (2017.01); *G06V 20/58* (2022.01); *B60K 2370/152* (2019.05); *B60K 2370/188* (2019.05); *G09G 2370/02* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 10,037,699 B1* | 7/2018 | Toyoda | G08G 1/0112 |
| 2010/0020169 A1* | 1/2010 | Jang | G01C 21/3697 340/436 |
| 2017/0060234 A1* | 3/2017 | Sung | G06F 3/147 |

FOREIGN PATENT DOCUMENTS

JP 2012-150557 A 8/2012

* cited by examiner

*Primary Examiner* — Matthew Yeung
(74) *Attorney, Agent, or Firm* — Hauptman Ham, LLP

(57) ABSTRACT

A vehicle display control apparatus is equipped with a display device, and a control unit that causes the display device to display a peripheral screen for presenting a driver of an own vehicle with a position of a different vehicle running around the own vehicle with respect to the own vehicle. The control unit is configured to acquire the position of the different vehicle with respect to the own vehicle and a driving manner score as a numerical rating scale representing how good driving manners of the different vehicle are, and display the driving manner score on the peripheral screen in such a manner as to correspond to the position of the different vehicle with respect to the own vehicle.

10 Claims, 16 Drawing Sheets

VEHICLE INFORMATION

| VEHICLE ID | VEHICLE POSITION | DRIVING MANNER SCORE | VEHICLE TYPE INFORMATION |
|---|---|---|---|
| VAa | Xa,Ya | Sa | Ma |
| VAb | Xb,Yb | Sb | Mb |
| ... | ... | ... | ... |

DRIVER INFORMATION

| DRIVER ID | DRIVING FREQUENCY N1a | TRAFFIC ACCIDENT HISTORY N1b | TRAFFIC VIOLATION HISTORY N1c | DRIVING ROUGHNESS INDEX N1d |
|---|---|---|---|---|
| DRa | N1a_a | N1b_a | N1c_a | N1d_a |
| DRb | N1a_b | N1b_b | N1c_b | N1d_b |
| ... | ... | ... | ... | ... |

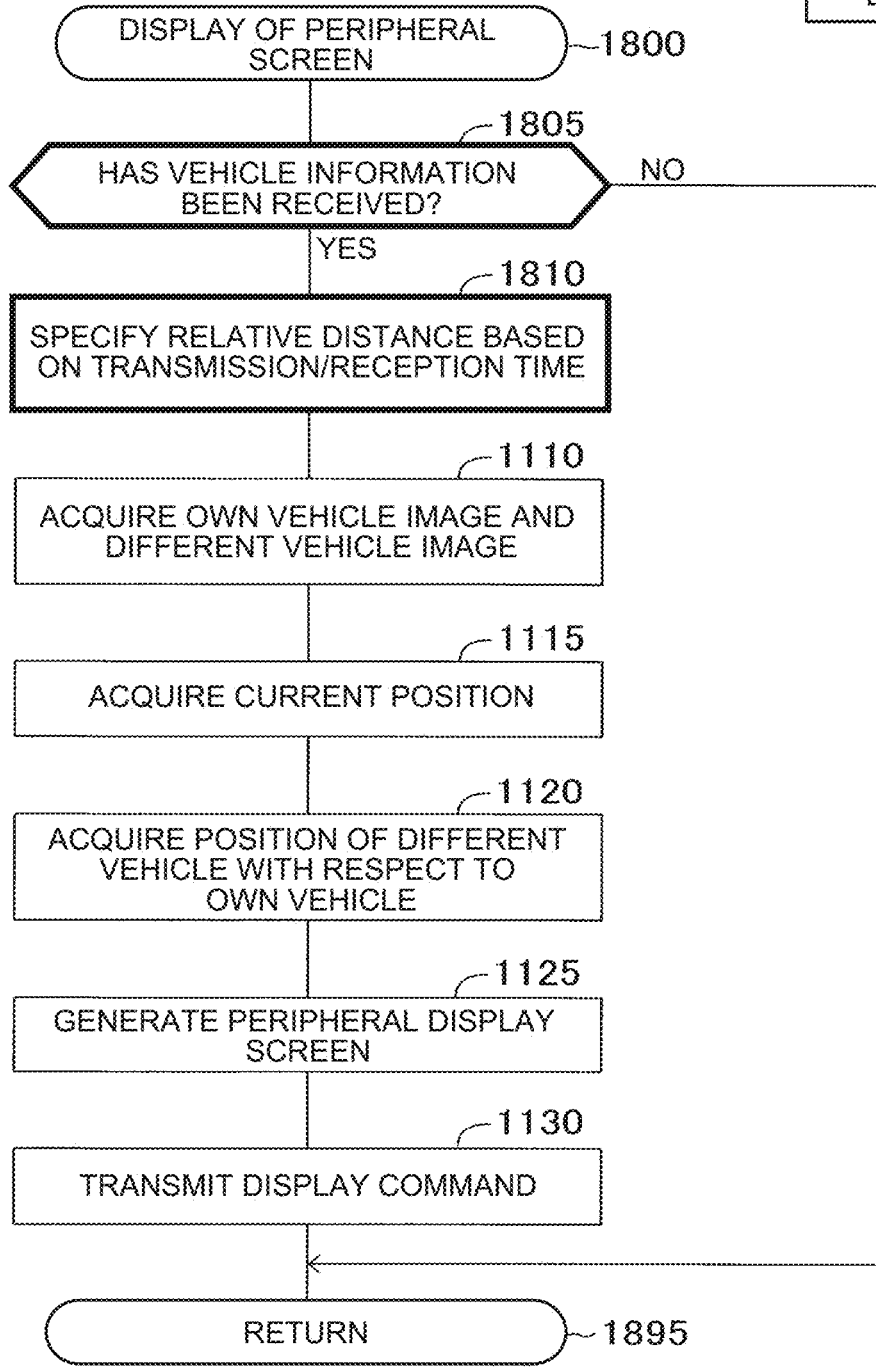

VEHICLE DISPLAY CONTROL APPARATUS AND VEHICLE DISPLAY CONTROL SYSTEM

CROSS-REFERENCE TO RELATED APPLICATION

This application claims priority to Japanese Patent Application No. 2021-080799 filed on May 12, 2021, incorporated herein by reference in its entirety.

BACKGROUND

1. Technical Field

The disclosure relates to a vehicle display control apparatus and a vehicle display control system for displaying a driving manner score as a numerical rating scale representing how good driving manners are.

2. Description of Related Art

Conventionally, there is known a vehicle display control apparatus that displays a driving manner score as a numerical rating scale representing how good driving manners of one's own vehicle are. For example, a vehicle display control apparatus described in Japanese Unexamined Patent Application Publication No. 2012-150557 (JP 2012-150557 A) (hereinafter referred to as "a conventional apparatus") acquires a driving manner score of one's own vehicle based on "a driving situation of the own vehicle" and "others' behavior of appreciating driving manners", and displays the driving manner score of the own vehicle.

SUMMARY

A driver desires to drive while grasping driving manners of other vehicles (different vehicles) that exist around an own vehicle that is driven by the driver. The conventional apparatus displays only the manner score of the own vehicle, and hence cannot fulfill this desire.

The disclosure has been made to cope with the foregoing problem. That is, it is one of objects of the disclosure to provide a vehicle display control apparatus that enables driving while grasping the driving manners of different vehicles.

A vehicle display control apparatus (hereinafter referred to as "the apparatus of an embodiment") is equipped with a display device (60) arranged at a predetermined position of an own vehicle, and a control unit (40) that causes the display device to display a peripheral screen (500, 1300) for presenting a driver of the own vehicle with a position of a different vehicle running around the own vehicle with respect to the own vehicle. The control unit is configured to acquire the position of the different vehicle with respect to the own vehicle and a driving manner score as a numerical rating scale representing how good driving manners of the different vehicle are ("Yes" in step 1105 and "Yes" in step 1805), and display the driving manner score in such a manner as to correspond to the position of the different vehicle with respect to the own vehicle, on the peripheral screen (step 1125 and step 1130).

Thus, the driving manner score of the different vehicle is displayed on the peripheral screen in such a manner as to correspond to the position of the different vehicle with respect to the own vehicle. Therefore, the driver of the own vehicle can drive the own vehicle while grasping the position of the different vehicle and how good the driving manners of the different vehicle are.

In one aspect of the embodiment, the control unit may be configured to store the driving manner score in association with absolute positions of a plurality of vehicles (200), transmit a request for acquisition including a current absolute position of the own vehicle to an administrative server (20) that is connected to the vehicle display control apparatus via a network in such a manner as to enable the exchange of data (step 630), receive an absolute position of the different vehicle that is a vehicle located within a predetermined range of the current absolute position of the own vehicle and the driving manner score of the different vehicle from the administrative server, as a response to the request for acquisition ("Yes" in step 1105), and acquire the position of the different vehicle with respect to the own vehicle, based on the current absolute position of the own vehicle and the absolute position of the different vehicle (step 1120).

Thus, the vehicle display control apparatus can acquire the absolute position and driving manner score of the different vehicle by transmitting the request for acquisition to the administrative server, and can acquire the position of the different vehicle with respect to the own vehicle based on the current absolute position of the own vehicle and the absolute position of the different vehicle.

In another aspect of the embodiment, the control unit may be configured to be able to exchange data with the different vehicle through vehicle-to-vehicle communication when a distance between the different vehicle and the own vehicle is shorter than a predetermined distance, receive a current absolute position of the different vehicle and the driving manner score of the different vehicle from the different vehicle via the vehicle-to-vehicle communication ("Yes" in step 1805), and acquire the position of the different vehicle with respect to the own vehicle based on a current absolute position of the own vehicle and the current absolute position of the different vehicle (step 1120 shown in FIG. 18).

Thus, the vehicle display control apparatus can acquire the absolute position and driving manner score of the different vehicle through vehicle-to-vehicle communication, and can acquire the position of the different vehicle with respect to the own vehicle based on the current absolute position of the own vehicle and the absolute position of the different vehicle.

In still another aspect of the embodiment, the control unit may be configured to acquire the driving manner score (step 620) as the numerical rating scale representing how good the driving manners of the different vehicle are, based on a history of driving by the driver of the different vehicle (steps 700 to 795), the number of times of a predetermined manner behavior of the different vehicle (steps 800 to 895), and the number of times of a predetermined appreciative action for the different vehicle by a third person (steps 900 to 995) ("Yes" in step 1105 and "Yes" in step 1805).

Thus, the driving manner score is acquired based on the history of driving by the driver and the manner behavior of the vehicle as well as the appreciative action by the third person. Thus, the driving manner score can more accurately represent how good the driving manners are. In consequence, the driving manner score represents a value more plausible to the driver.

In still another aspect of the embodiment, the control unit may be configured to display the driving manner score on the peripheral screen when the driving manner score of the different vehicle is equal to or larger than a predetermined threshold (step 1505), and refrain from displaying the driving manner score on the peripheral screen when the driving manner score of the different vehicle is smaller than the threshold (step 1505).

Thus, the driver of the own vehicle cannot specify the exact value of the driving manner score of the different vehicle that is smaller than the threshold.

The control unit may be configured to display the driving manner score of the different vehicle made to correspond to the position of the different vehicle with respect to the own vehicle, by displaying a color corresponding to the driving manner score of the different vehicle located in each of a plurality of divisional regions obtained by dividing a region around the own vehicle for each of the divisional regions on the peripheral screen (FIG. 13, step 1405, and step 1410).

Thus, the driver of the own vehicle can grasp the driving manner scores of the divisional regions by merely looking at the colors of the divisional regions on the peripheral screen.

A vehicle display control system is equipped with a first vehicle (30), and an administrative server (20) connected to the first vehicle via a network in such a manner as to enable the exchange of data. The administrative server is configured to store absolute positions of a plurality of second vehicles (30) and driving manner scores as numerical rating scales representing how good driving manners of the second vehicles are, in association with each other respectively (200), and transmit an absolute position of at least one different vehicle that is the second vehicle located around a current absolute position of the first vehicle and the driving manner score of the different vehicle, to the first vehicle, as a response to a request for acquisition including the current absolute position of the first vehicle (step 1020), upon receiving the request for acquisition from the first vehicle (step 1005). The first vehicle is configured to acquire a position of the different vehicle with respect to the first vehicle based on the current absolute position of the first vehicle and the absolute positions of the second vehicles, upon receiving the absolute positions of the second vehicles and the driving manner scores of the second vehicles (step 1120), and display the driving manner scores of the second vehicles in such a manner as to correspond to the positions of the second vehicles with respect to the first vehicle, on a peripheral screen (500, 1300) that is displayed by a display device of the first vehicle to present a driver of the first vehicle with the positions of the second vehicles with respect to the first vehicle (step 1125 and step 1130).

Thus, the driving manner scores of the second vehicles are displayed on the peripheral screen in such a manner as to correspond to the positions of the second vehicles with respect to the first vehicle respectively. Therefore, the driver of the first vehicle can drive the first vehicle while grasping the positions of the second vehicles and how good the driving manners of the second vehicles are.

Incidentally, in the foregoing description, with a view to helping understand the embodiment, the configurations of the disclosure corresponding to the embodiments that will be described later are accompanied by names and/or reference symbols used in the embodiments in parenthesis respectively. However, the respective components of the disclosure are not limited to the embodiments prescribed by the names and/or the reference symbols. Other objects and features and resultant advantages of the embodiment will be easily understood from the description of the embodiments with reference to the following drawings.

BRIEF DESCRIPTION OF THE DRAWINGS

Features, advantages, and technical and industrial significance of exemplary embodiments will be described below with reference to the accompanying drawings, in which like signs denote like elements, and wherein:

FIG. 18 is a flowchart showing a peripheral screen display routine that is executed by the CPU of the control ECU according to the fourth modification example of the embodiment.

DETAILED DESCRIPTION OF EMBODIMENTS

Figures 1, 2:
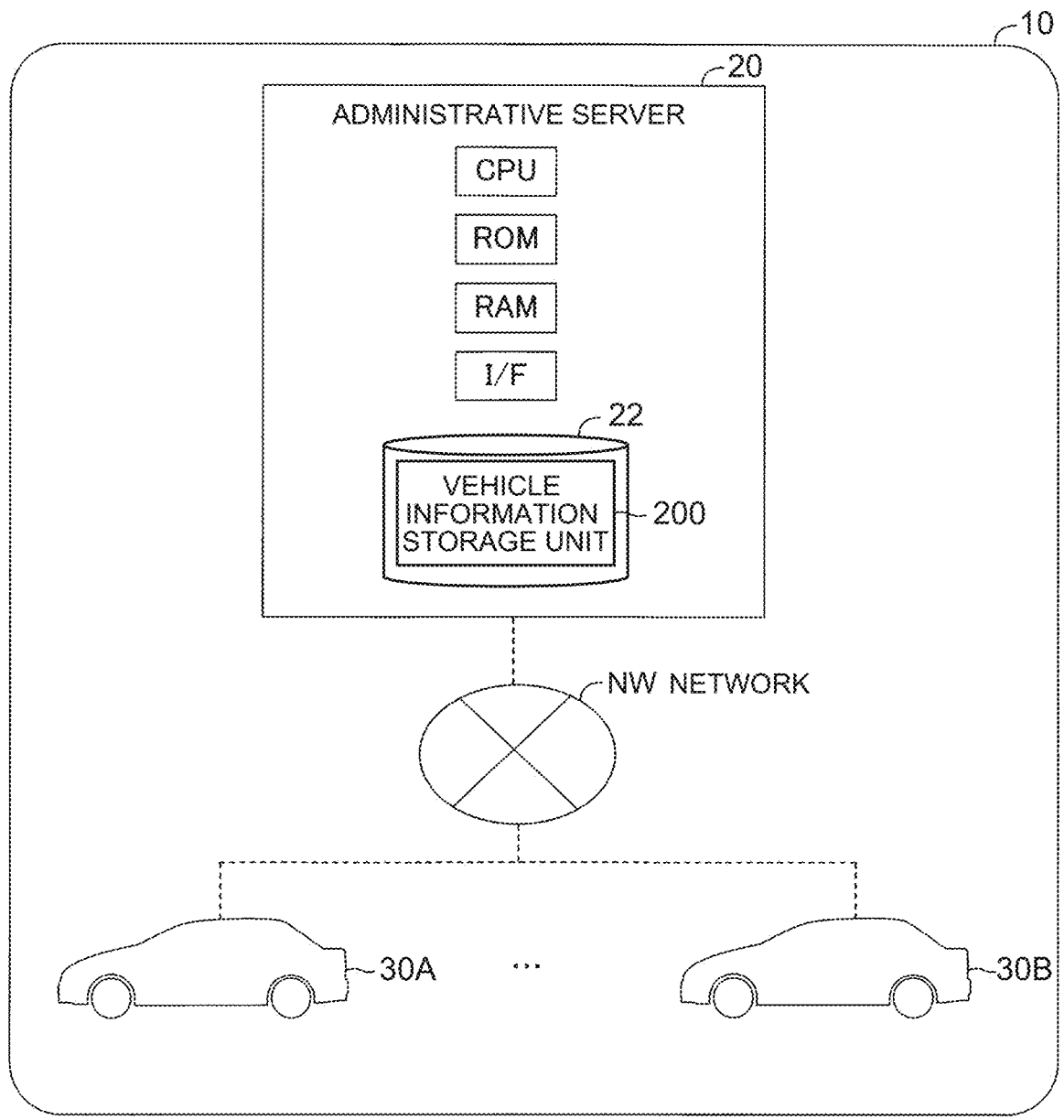
FIG. 1 is an overall system configuration view of a display control system according to one of the embodiments.
FIG. 2 is an illustrative view of vehicle information stored in an administrative server shown in FIG. 1.

As shown in FIG. 1, a vehicle display control system according to one of the embodiments (hereinafter referred to as "the present system") 10 is equipped with an administrative server 20 and a plurality of vehicles 30A to 30N. Each of the vehicles (30A to 30N) will be referred to as "the vehicle 30" when these vehicles do not need to be distinguished from one another. The vehicles 30 are connected to the administrative server 20 via a network NW in such a manner as to enable the exchange of data.

⟨Administrative Server 20⟩

The administrative server 20 is equipped with a CPU, a ROM, a RAM, an interface (I/F), and a storage device 22. The administrative server 20 retrieves and reads out data stored in the storage device 22, and writes (stores) data into the storage device 22.

The storage device 22 is a non-volatile storage medium or storage device, and has a vehicle information storage unit 200 that stores vehicle information shown in FIG. 2. A vehicle ID, a vehicle position, a driving manner score S, and vehicle type information are stored in the vehicle information. The vehicle ID is a unique identifier of the vehicle 30. The vehicle position is a current absolute position (e.g., a latitude and a longitude) of the vehicle 30. The driving manner score S is a numerical rating scale representing how good the current driving manners of a driver of the vehicle 30 are. It is understood that the larger the value of the driving manner score S is, the better the driving manners are. The vehicle type information includes a type of the vehicle 30 (light vehicle, passenger vehicle, freight vehicle, or the like) and a traveling direction of the vehicle 30. The traveling direction of the vehicle 30 is acquired based on the history of the absolute position of the vehicle 30.

⟨Vehicle 30⟩

The vehicle 30 acquires the driving manner score S at intervals of a predetermined time, and transmits "a request for acquisition including the vehicle ID, the driving manner score S, and the current position of the vehicle 30" to the administrative server 20. Incidentally, upon receiving the request for acquisition, the administrative server 20 updates the vehicle information, and transmits different vehicle information that is vehicle information on other vehicles 30 (hereinafter referred to as "the different vehicles") located around the vehicle 30 that has transmitted the request for acquisition. Furthermore, upon receiving the different vehicle information, the vehicle 30 displays a peripheral screen 500 (see FIG. 5) including "positions of the different vehicles" and "driving manner scores of the different vehicles".

The vehicle 30 is mounted with a display control apparatus 35. The display control apparatus 35 is equipped with "a control ECU 40 including a microcomputer". The microcomputer includes a CPU, a ROM, a RAM, an interface (I/F), and the like. The CPU realizes various functions by executing instructions (programs and routines) stored in the ROM. Incidentally, the ECU 41 may be referred to as "a control unit or a controller".

The vehicle 30 is equipped with a driver seat camera 42, an off-vehicle camera 44, a millimeter-wave radar 46, an off-vehicle microphone 48, an accelerator pedal operation amount sensor 50, a brake pedal operation amount sensor 52, a steering angle sensor 54, wheel speed sensors 56, a longitudinal acceleration sensor 58, and a lateral acceleration sensor 59. These components are connected to the control ECU 40 in such a manner as to enable the exchange of data.

The driver seat camera 42 acquires a driver seat image by photographing the face of a driver seated in a driver seat of the vehicle 30. The off-vehicle camera 44 is disposed at an upper portion of a windshield in a vehicle interior of the vehicle 30. The off-vehicle camera 44 acquires an image (an off-vehicle camera image) in a region in front of the vehicle 30, and acquires object information (a distance to an object (a different vehicle, a pedestrian, or the like), an orientation of the object, and the like), "information (hereinafter referred to as "white line information") on white lines (dividing lines) for separating lanes in which vehicles run from one another", and the like.

The millimeter-wave radar 46 is provided in the vicinity of a center of a front end of the vehicle 30 in a vehicle width direction. The millimeter-wave radar 46 emits millimeter waves propagating to a predetermined range in front of the vehicle 30. The millimeter waves are reflected by an object. The millimeter-wave radar 46 receives these reflected waves, and acquires object information based on the reflected waves. The object information includes a distance to the object, a speed of the object relative to the vehicle 30, an orientation of the object with respect to the vehicle 30, and the like.

Incidentally, the control ECU 40 acquires ultimate object information by correcting the object information acquired by the millimeter-wave radar 46 based on the object information acquired by the off-vehicle camera 44.

The off-vehicle microphone 48 collects sounds and voices outside the vehicle 30.

The accelerator pedal operation amount sensor 50 detects an operation amount of an accelerator pedal 50a of the vehicle 30 (i.e., an accelerator pedal operation amount AP), and generates a signal representing the accelerator pedal operation amount AP. The accelerator pedal operation amount AP is "0" when the driver does not depress the accelerator pedal 50a The accelerator pedal operation amount AP increases as the depth to which the driver depresses the accelerator pedal 50a increases. The control ECU 40 specifies the accelerator pedal operation amount AP based on the signal from the accelerator pedal operation amount sensor 50.

The brake pedal operation amount sensor 52 detects an operation amount of a brake pedal 52a of the vehicle 30 (i.e., a brake pedal operation amount BP), and generates a signal representing the brake pedal operation amount BP. The brake pedal operation amount BP is "0" when the driver does not depress the brake pedal 52a. The brake pedal operation amount BP increases as the depth to which the driver depresses the brake pedal 52a increases. The control ECU 40 specifies the brake pedal operation amount BP based on the signal from the brake pedal operation amount sensor 52.

The steering angle sensor 54 detects a rotational angle of a steering wheel 54a from a neutral position as a steering angle θs, and generates a signal representing the steering angle θs. The control ECU 40 acquires the steering angle θs based on the signal generated by the steering angle sensor 54.

The wheel speed sensors 56 are provided for wheels of the vehicle 30 respectively. Each of the wheel speed sensors 56 generates a wheel pulse signal every time a corresponding one of the wheels rotates by a predetermined angle. The control ECU 40 counts the numbers of pulses per unit time of wheel pulse signals received by the wheel speed sensors 56 respectively, and acquires rotational speeds (wheel speeds) of the wheels based on the numbers of pulses respectively. The control ECU 40 then acquires a vehicle speed Vs indicating a speed of the vehicle 30 based on the wheel speeds of the respective wheels. For example, the control ECU 40 acquires an average of the wheel speeds of the four wheels as the vehicle speed Vs.

The longitudinal acceleration sensor 58 detects a longitudinal acceleration Gx that is an acceleration of the vehicle 30 in a longitudinal direction thereof, and generates a signal representing the longitudinal acceleration Gx. The control ECU 40 acquires the longitudinal acceleration Gx based on the signal generated by the longitudinal acceleration sensor 58.

The lateral acceleration sensor 59 detects a lateral acceleration Gy that is an acceleration of the vehicle 30 in a lateral direction thereof, and generates a signal representing the lateral acceleration Gy. The control ECU 40 acquires the lateral acceleration Gy based on the signal generated by the lateral acceleration sensor 59.

Furthermore, the vehicle 30 is equipped with a display device 60, a hazard lamp 62, a horn 64, a storage device 66, a GNSS receiver 68, a network communication device 70, and a vehicle-to-vehicle communication device 72. These components are connected to the control ECU 40 in such a manner as to enable the exchange of data.

The display device 60 receives a display command from the control ECU 40 and a navigation device (not shown) or the like, and displays a screen corresponding to the display command.

The hazard lamp 62 blinks (is active) when a hazard switch (not shown) is at an on-position due to the operation of the hazard switch by the driver, and is extinct w % ben the hazard switch (not shown) is at an off-position due to the operation of the hazard switch by the driver. The driver not only activates the hazard lamp 62 to notify the surroundings of the vehicle 30 that the vehicle 30 is about to stop, but also activates the hazard lamp 62 to show gratitude (appreciation) for behaviors of the different vehicles 30 based on good manners.

The horn 64 is a speaker that outputs a warning sound to the outside of the vehicle. The horn 64 is active (outputs a warning sound) when the driver operates a horn switch (not shown), and is not active (does not output a warning sound) when the driver does not operate the horn switch (not shown). The driver not only activates the horn 64 to notify the surroundings of the vehicle 30 of danger, but also activates the horn 64 to show gratitude (appreciation) for the behavior of the different vehicles 30 based on good manners.

Figures 4, 5:
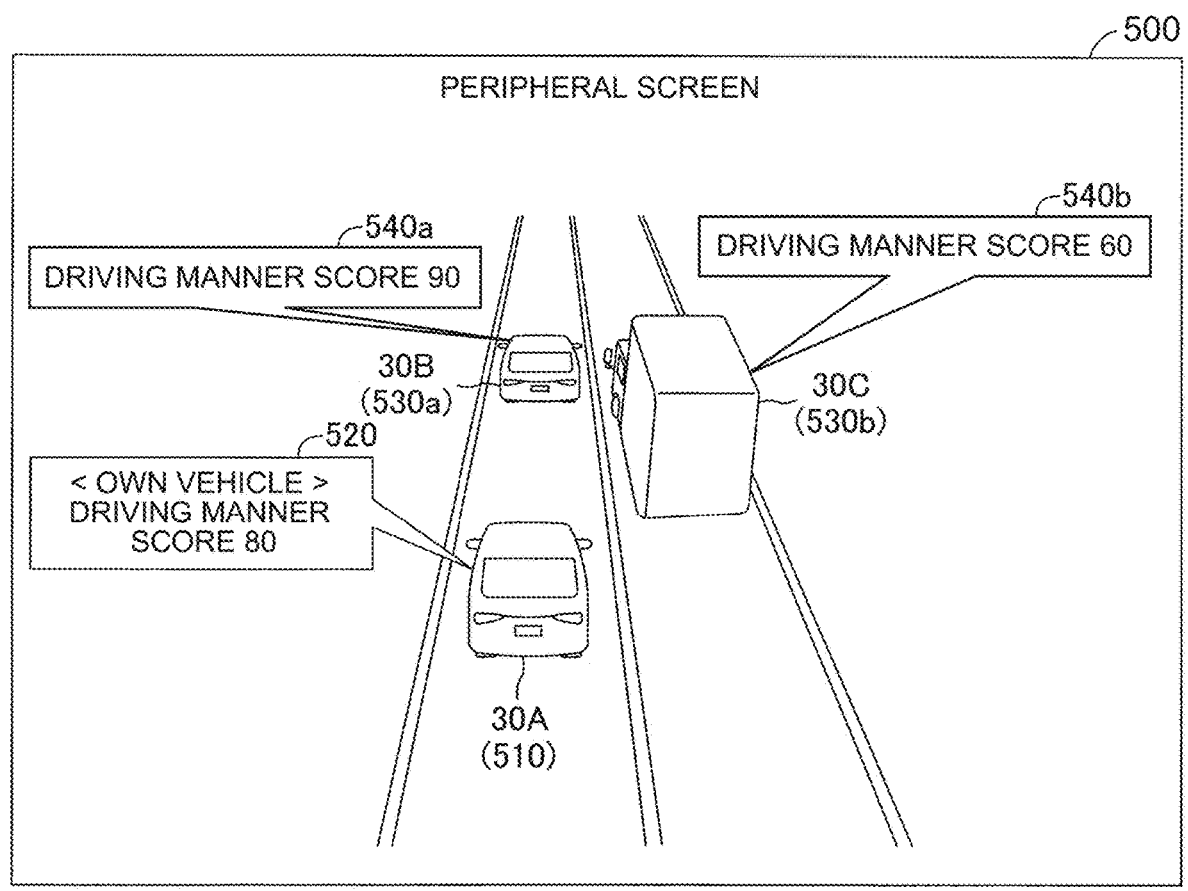
FIG. 4 is an illustrative view of driver information stored in the vehicle shown in FIG. 1.
FIG. 5 is an illustrative view of a peripheral screen displayed in the vehicle shown in FIG. 1.

The storage device 66 is a non-volatile storage device or storage medium, and has a driver information storage unit 660 that stores driver information shown in FIG. 4. In the driver information, a history of driving by the driver of the vehicle 30 is stored. More specifically, a driver ID, a driving frequency N1$a$, a traffic accident history N1$b$, a traffic violation history N1$c$, and a driving roughness index N1$d$ are stored as a single record in the driver information.

The driver ID is a unique identifier of the driver who drives the vehicle 30. The driving frequency N1$a$ is the number of times of driving of the vehicle 30 by the driver in a predetermined period (e.g., a week or a month). When the driver changes an ignition key switch from an off-position to an on-position, the control ECU 40 identifies the driver in a driver seat image by acquiring the driver seat image from the driver seat camera 32, and matching the driver seat image with preregistered face images of respective drivers. The control ECU 40 then adds "1" to the driving frequency N1$a$ that is in the record of the driver ID corresponding to the identified driver. Incidentally, the control ECU 40 sets the driving frequency N1$a$ to "0" upon the arrival of a predetermined time and date.

The traffic accident history N1$b$ is the number of traffic accidents caused by the driver up to the present. The traffic violation history N1$c$ is the number of traffic violations of the driver up to the present. The control ECU 40 acquires information from a server (not shown) in which information on these values is stored, at predetermined timings, and updates the traffic accident history N1$b$ and the traffic violation history N1$c$.

The driving roughness index N1$d$ is an index representing the roughness of driving by the driver. The degree of roughness of driving by the driver increases as the value of the index increases. The control ECU 40 acquires the driving roughness index N1$d$ based on a time differential value of the longitudinal acceleration Gx and a time differential value of the lateral acceleration Gy. For example, the control ECU 40 may obtain a maximum of an absolute value of the time differential value of the longitudinal acceleration Gx and a maximum of an absolute value of the time differential value of the lateral acceleration Gy in a period from "a timing when the driver changes the ignition key switch from the off-position to the on-position" to "a timing when the driver changes the ignition key switch from the on-position to the off-position", and acquire the sum of these maximums as the driving roughness index N1$d$.

Incidentally, the control ECU 40 may acquire the driving roughness index N1$d$ based on a time differential value of the accelerator pedal operation amount AP, a time differential value of the brake pedal operation amount BP, and a time differential value of an amount of change in the steering angle θs in the foregoing period. The driving roughness index N1$d$ is acquired in such a manner as to indicate that the degree of roughness of driving increases as these time differential values increase.

Figure 3:
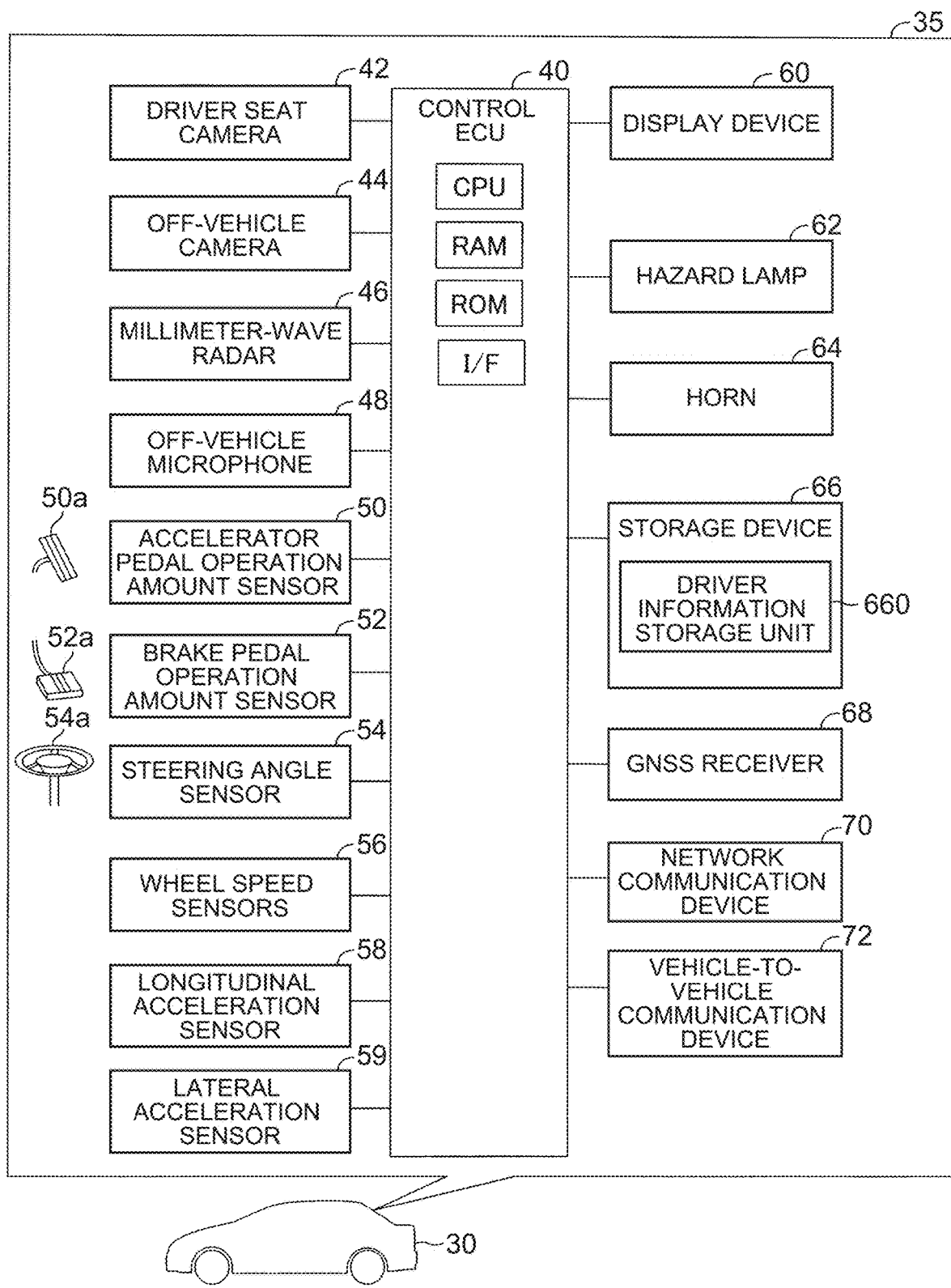
FIG. 3 is an overall system configuration view of a display control apparatus applied to a vehicle shown in FIG. 1.

The GNSS receiver 68 shown in FIG. 3 receives "a signal from an artificial satellite (a GNSS signal)" for detecting a current absolute position (e.g., a latitude and a longitude) of the vehicle 30.

The network communication device 70 includes a wireless communication device for establishing communication with the network NW, and is configured to enable the exchange of data between the control ECU 40 and the administrative server 20.

The vehicle-to-vehicle communication device 72 includes a wireless communication device for establishing communication with the different vehicles 30. The vehicle-to-vehicle communication device 72 can exchange data with the vehicle-to-vehicle communication devices 72 of the different vehicles 30 located within a predetermined communicable range.

(Outline of Action)

The control ECU 40 of the vehicle 30 causes the display device 60 to display the peripheral screen 500 shown in FIG. 5. The vehicle 30 displaying the peripheral screen 500 will be referred to hereinafter as "the own vehicle 30A".

The peripheral screen 500 is a screen for presenting the driver of the own vehicle 30 with positions of "the different vehicles 30B and 30C running around the own vehicle 30A" with respect to the own vehicle 30A. Furthermore, driving manner scores S (the different vehicle B: 90, the different vehicle C: 60) of the different vehicles 30B and 30C made to correspond to the positions of the different vehicles 30B and 30C with respect to the own vehicle 30A are displayed on the peripheral screen 500.

A concrete description will be given hereinafter.

The own vehicle 30A specifies a current absolute position (hereinafter referred to as "the current position") of the own vehicle 30A based on the GNSS signal received by the GNSS receiver 68, and transmits a request for acquisition including the current position to the administrative server 20.

Upon receiving the request for acquisition, the administrative server 20 refers to the vehicle information shown in FIG. 2, and acquires vehicle information including absolute positions of vehicles located within a predetermined range from the current position included in the request for acquisition, the driving manner scores S, and vehicle type information (the types and traveling directions of the vehicles). In this case, vehicle information on the different vehicles 30B and 30C is acquired. After that, the administrative server 20 transmits the vehicle information on the different vehicles 30B and 30C to the own vehicle 30A as a response to the request for acquisition.

A three-dimensional image of the own vehicle 30A (an own vehicle image 510) and three-dimensional images corresponding to the types of the vehicles 30 respectively are stored in advance in the ROM of the control ECU 40 of the own vehicle 30A. The control ECU 40 of the own vehicle 30A displays the own vehicle image 510 as viewed in a forward direction of the own vehicle 30A from a point of view behind the own vehicle 30A, at a predetermined position in the vicinity of a center of the peripheral screen 500. Incidentally, the control ECU 40 displays a manner image 520 for presenting a driving manner score S(80) of the own vehicle 30A in such a manner as to correspond to the own vehicle image 510, in the vicinity of the own vehicle image 510. The manner image 520 is an image of a speech balloon with an arrow. In the speech balloon, the driving manner score S of the own vehicle 30A is displayed, and the arrow of the speech balloon indicates the own vehicle image 510.

Upon receiving the vehicle information, the control ECU 40 of the own vehicle 30A specifies positions of the different vehicles 30B and 30C with respect to the own vehicle 30A, based on a current position of the own vehicle 30A and absolute positions of the different vehicles 30B and 30C. The control ECU 40 then displays the three-dimensional image corresponding to the type of the different vehicle 30B (passenger vehicle) at "the position of the different vehicle 30B with respect to the own vehicle 30A" as a different vehicle image 530a, in such a manner as to correspond to the traveling direction of the different vehicle 30B with respect to the traveling direction of the own vehicle 30A. Furthermore, the control ECU 40 displays a manner image 540a for presenting a driving manner score S (90) of the different vehicle 30B in the vicinity of the different vehicle image 530a, in such a manner as to correspond to the different vehicle image 530b.

By the same token, the control ECU 40 displays the three-dimensional image corresponding to the freight vehicle that is the type of the different vehicle 30C as the different vehicle image 530b, and displays a manner image 540b for presenting a driving manner score S (60) of the different vehicle 30C.

The manner images 540a and 540b are images of speech balloons with arrows. In the speech balloons, the driving manner scores S of the different vehicle 30B and the different vehicle 30C are displayed respectively, and the arrows of the speech balloons indicate the different vehicle image 530a and the different vehicle image 530b respectively.

On the peripheral screen 500 of the present embodiment, the manner images 540a and 540b are displayed in such a manner as to correspond to the different vehicle images 530a and 530b respectively. Thus, the driver of the own vehicle 30A can drive while grasping the driving manner scores of the different vehicles 30a and 30b.

(Concrete Action)
⟨Driving Manner Score Acquisition Routine⟩
The CPU of the control ECU 40 (hereinafter "a first CPU" will mean "the CPU of the control ECU 40 unless otherwise specified) executes a driving manner score acquisition routine shown as a flowchart in FIG. 6 at intervals of a predetermined time.

Figure 6:
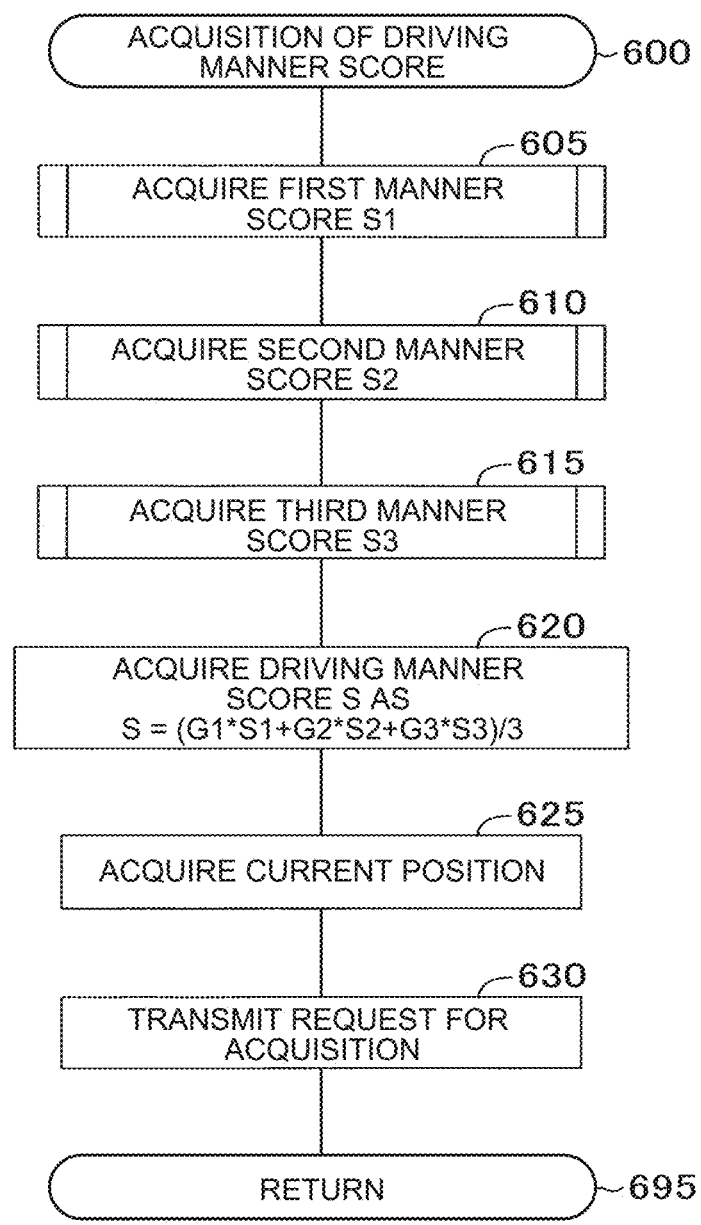
FIG. 6 is a flowchart showing a driving manner score acquisition routine that is executed by a CPU of a control ECU shown in FIG. 3.

Accordingly, upon the arrival of each of predetermined timings, the first CPU starts the process from step 600 of FIG. 6, and carries out steps 605 to 630 in this sequence. After that, the first CPU proceeds to step 695 to temporarily end the present routine.

In step 605, the first CPU executes a first manner score acquisition subroutine for acquiring a first manner score S1 based on a history regarding the current driving of the vehicle 30. Actually, upon proceeding to step 605, the first CPU executes a subroutine shown as a flowchart in FIG. 7. The process in this subroutine will be described later.

In step 610, the first CPU executes a second manner score acquisition subroutine for acquiring a second manner score S2 based on the behavior of the vehicle 30. Actually, upon proceeding to step 610, the first CPU executes a subroutine shown as a flowchart in FIG. 8. The process in this subroutine will be described later.

In step 615, the first CPU executes a third manner score acquisition subroutine for acquiring a third manner score S3 based on an appreciative action for driving manners from a third person. Actually, upon proceeding to step 615, the first CPU executes a subroutine shown as a flowchart in FIG. 9. The process in this subroutine will be described later.

In step 620, the first CPU acquires the driving manner score S based on the first manner score S1, the second manner score S2, and the third manner score S3.

For example, each of the first manner score S1, the second manner score S2, and the third manner score S3 is an integer ranging from "0" to "100". The first CPU acquires the driving manner score S by applying the first manner score S1, the second manner score S2, and the third manner score S3 to an equation 1 shown below.

$$S=(G1\times S1+G2\times S2+G3\times S3)/3 \qquad \text{Equation 1}$$

In the equation 1, "G1" is a first weighting factor, "G2" is a second weighting factor, and "G3" is a third weighting factor. Each of the first weighting factor G1, the second weighting factor G2, and the third weighting factor G3 is set in advance to an appropriate value ranging from "0.0" to "1.0". For example, the third weighting factor is desirably set to the largest value.

In step 625, the first CPU acquires a current position of the vehicle 30 based on a GNSS signal received by the GNSS receiver 68.

In step 630, the first CPU transmits a request for acquisition including the vehicle ID, the current position of the vehicle 30, the driving manner score S. and the vehicle type (type) to the administrative server 20. Incidentally, the vehicle ID and the vehicle type (type) are stored in advance in the ROM of the control ECU 40.

Figure 7:
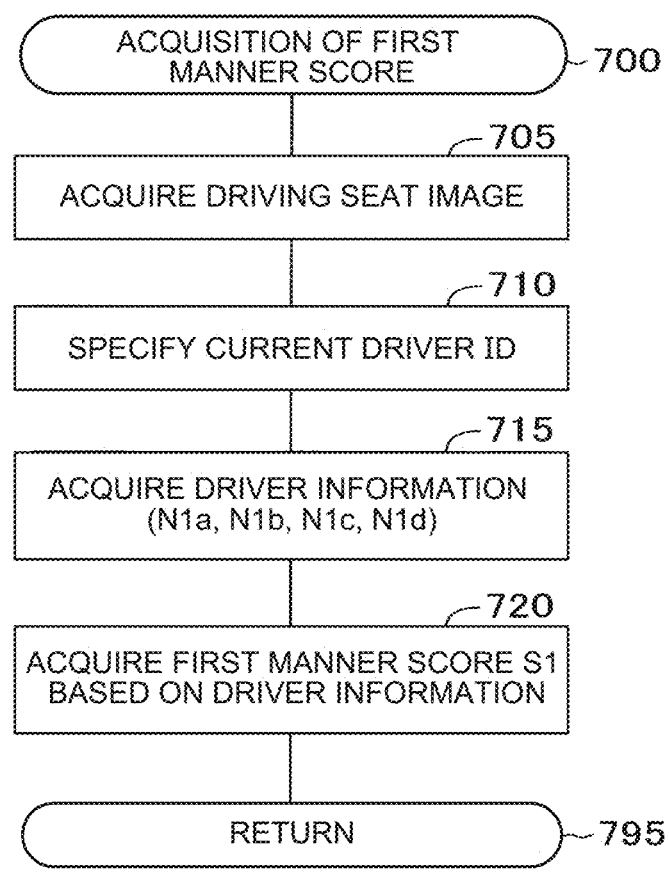
FIG. 7 is a flowchart showing a first manner score acquisition routine that is executed by the CPU of the control ECU shown in FIG. 3.

⟨First Manner Score Acquisition Subroutine⟩
Upon proceeding to step 605 shown in FIG. 6, the first CPU starts the process from step 700 shown in FIG. 7, and carries out steps 705 to 720. After that, the first CPU proceeds to step 795 to temporarily end the present routine, and proceeds to step 610 shown in FIG. 6.

In step 705, the first CPU acquires a driver seat image from the driver seat camera 42. In step 710, the first CPU specifies a driver ID that is an identifier of the current driver (hereinafter referred to as "the current driver ID") by collating the driver seat image with a driver image registered in advance. Incidentally, the driver image is registered in association with the driver ID corresponding to the driver image.

In step 715, the first CPU refers to driver information, and acquires pieces of driver information (the driving frequency N1$a$, the traffic accident history N1$b$, the traffic violation history N1$c$, and the driving roughness index N1$d$) corresponding to the current driver ID.

In step 720, the first CPU acquires the first manner score S1 based on the driver information.

More specifically, the first CPU acquires the first manner score S1 as follows.

The first CPU acquires the first manner score S1 such that the first manner score S1 increases as the driving frequency N1$a$ rises.

The first CPU acquires the first manner score S1 such that the first manner score S1 increases as the number of traffic accidents in the traffic accident history N1$b$ decreases.

The first CPU acquires the first manner score S1 such that the first manner score S1 increases as the number of traffic violations in the traffic violation history N1$c$ decreases.

The first CPU acquires the first manner score S1 such that the first manner score S1 increases as the driving roughness index N1$d$ decreases.

⟨Second Manner Score Acquisition Subroutine⟩

Figure 8:
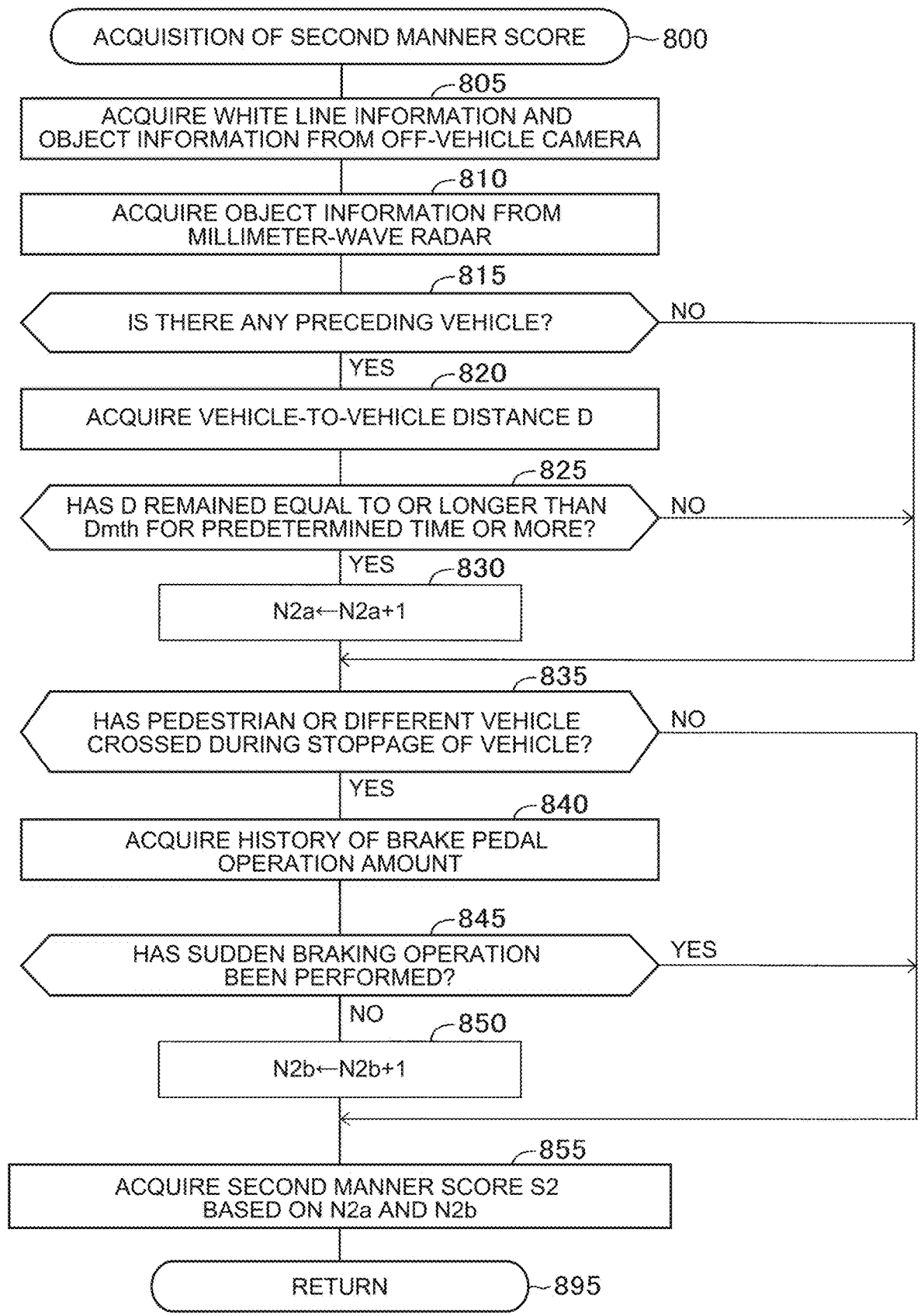
FIG. 8 is a flowchart showing a second manner score acquisition routine that is executed by the CPU of the control ECU shown in FIG. 3.

Upon proceeding to step 610 shown in FIG. 6, the first CPU starts the process from step 800 shown in FIG. 8, and carries out steps 805 to 815.

In step 805, the first CPU acquires white line information and object information from the off-vehicle camera 44.

In step 810, the first CPU acquires object information from the millimeter-wave radar 46.

In step 815, the first CPU determines whether or not there is a preceding vehicle, based on the object information from the off-vehicle camera 44 and the object information from the millimeter-wave radar 46.

More specifically, the first CPU determines that there is a preceding vehicle, when there is any different vehicle that fulfills conditions 1 to 3 shown below.

The condition 1 is that the different vehicle runs in the same lane as the vehicle 30.

The condition 2 is that the different vehicle runs in front of the vehicle 30 and a vehicle-to-vehicle distance D between the vehicle 30 and the different vehicle is the shortest.

The condition 3 is that the vehicle-to-vehicle distance D between the vehicle 30 and the different vehicle is equal to or shorter than a preceding vehicle distance Dsth.

If there is a preceding vehicle, the first CPU determines in step 815 that the result of determination is "Yes", and carries out step 820 and step 825 in this sequence.

In step 820, the first CPU acquires the vehicle-to-vehicle distance D between the vehicle 30 and the preceding vehicle.

In step 825, the first CPU determines whether or not the vehicle-to-vehicle distance D has remained equal to or longer than a manner distance Dmth (this state will be referred to hereinafter as "a manner distance maintaining state") for a predetermined time.

The manner distance Dmth is set in advance to a value shorter than the preceding vehicle distance Dsth.

If the manner distance maintaining state has lasted for the predetermined time, the first CPU determines in step 825 that the result of determination is "Yes", and carries out step 830 and step 835 in this sequence.

In step 830, the first CPU adds "1" to a manner distance counter N2$a$.

In step 835, the first CPU determines whether or not there is a crossing object (a pedestrian, a different vehicle, a two-wheeled vehicle, or the like) that has crossed an area in front of the vehicle 30 during stoppage of the vehicle 30 (i.e., while the vehicle speed Vs is "0"), based on the object information from the off-vehicle camera 44 and the object information from the millimeter-wave radar 46.

If the crossing object exists, the first CPU determines in step 835 that the result of determination is "Yes", and carries out step 840 and step 845 in this sequence.

In step 840, the first CPU acquires a history of the brake pedal operation amount BP until the lapse of a predetermined time from a timing when it is determined that the crossing object exists.

In step 845, the first CPU determines whether or not sudden braking operation has been performed, based on the history of the brake pedal operation amount BP.

More specifically, the first CPU determines whether or not there is a time point when the amount of increase in the brake pedal operation amount BP per unit time is equal to or larger than a predetermined amount.

If the sudden braking operation has not been performed, the first CPU determines in step 845 that the result of determination is "No", and carries out step 850 and step 855 in this sequence. After that, the first CPU proceeds to step 895 to temporarily end the present routine, and proceeds to step 615 shown in FIG. 6.

In step 850, the first CPU adds "1" to a manner stop counter N2$b$.

In step 855, the first CPU acquires the second manner score S2 based on the manner distance counter N2$a$ and the manner stop counter N2$b$.

More specifically, the first CPU acquires the second manner score S2 such that the second manner score S2 increases as the value of the manner distance counter N2$a$ increases. Furthermore, the first CPU acquires the second manner score S2 such that the second manner score S2 increases as the value of the manner stop counter N2$b$ increases.

If there is no preceding vehicle when the first CPU proceeds to step 815, the first CPU determines in step 815 that the result of determination is "No", and proceeds to step 835.

If the manner distance maintaining state has not lasted for the predetermined time or more when the first CPU proceeds to step 825, the first CPU determines in step 825 that the result of determination is "No", and proceeds to step 835.

If the vehicle 30 is not stopped or there is no crossing object when the first CPU proceeds to step 835, the first CPU determines in step 835 that the result of determination is "No", and proceeds to step 855.

If sudden braking operation has been performed when the first CPU proceeds to step 845, the first CPU determines in step 845 that the result of determination is "Yes", and proceeds to step 855.

⟨Third Manner Score Acquisition Subroutine⟩

Figure 9:
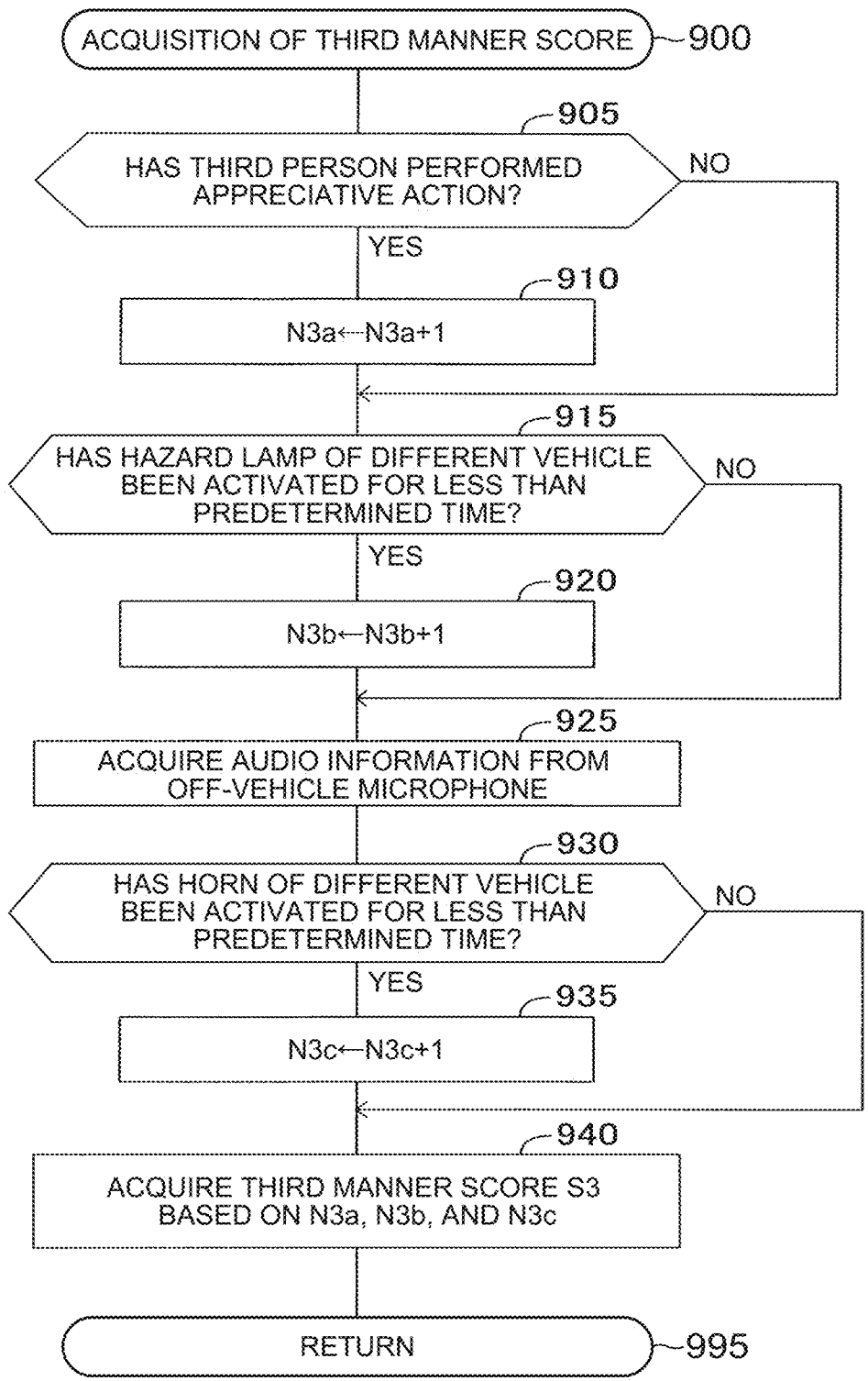
FIG. 9 is a flowchart showing a third manner score acquisition routine that is executed by the CPU of the control ECU shown in FIG. 3.

Upon proceeding to step 615 shown in FIG. 6, the first CPU starts the process from step 900 shown in FIG. 9, and proceeds to step 905. In step 905, the first CPU determines whether or not the third person such as the pedestrian or the driver of the different vehicle has performed "an action for showing gratitude for the driving manners of the vehicle 30 (hereinafter referred to as "an appreciative action")", based on an off-vehicle camera image. The appreciative action is, for example, the raising of a hand, bowing, or the like.

If the third person has performed the appreciative action, the first CPU determines in step 905 that the result of determination is "Yes", and carries out step 910 and step 915 in this sequence.

In step 910, the first CPU adds "1" to an appreciative action counter N3a.

In step 915, the first CPU determines whether or not the different vehicle has activated the hazard lamp 62 for a time shorter than a predetermined time, based on the off-vehicle camera image.

If the different vehicle has activated the hazard lamp 62 for a time shorter than the predetermined time, the first CPU determines in step 915 that the result of determination is "Yes", and carries out steps 920 to 930 in this sequence.

In step 920, the first CPU adds "1" to a hazard counter N3b.

In step 925, the first CPU acquires audio information from the off-vehicle microphone 48.

In step 930, the first CPU determines whether or not the different vehicle has activated the horn 64 for a time shorter than a predetermined time, based on the audio information.

If the different vehicle has activated the horn 64 for a time shorter than the predetermined time, the first CPU determines in step 930 that the result of step 930 is "Yes", and carries out step 935 and step 940 in this sequence. After that, the first CPU proceeds to step 995 to temporarily end the present routine, and proceeds to step 620 shown in FIG. 6.

In step 935, the first CPU adds "1" to a horn counter N3c.

In step 940, the first CPU acquires the third manner score S3 based on the values of the appreciative action counter N3a, the hazard counter N3b, and the born counter N3c. More specifically, the first CPU acquires the third manner score S3 such that the third manner score S3 increases as each of the values of the appreciative action counter N3a, the hazard counter N3b and the horn counter N3c increases.

If the third person has not performed the appreciative action when the first CPU proceeds to step 905, the first CPU determines in step 905 that the result of determination is "No", and proceeds to step 915.

If the different vehicle has activated the hazard lamp 62 for the predetermined time or more or has not activated the hazard lamp 62 when the first CPU proceeds to step 915, the first CPU determines in step 915 that the result of determination is "No", and proceeds to step 925.

If the different vehicle has activated the horn 64 for the predetermined time or more or has not activated the horn 64 when the first CPU proceeds to step 930, the first CPU determines in step 930 that the result of determination is "No", and proceeds to step 940.

⟨Different Vehicle Information Transmission Routine⟩

The CPU of the administrative server 20 (hereinafter "a second CPU" will mean the CPU of the administrative server 20 unless otherwise specified) executes a different vehicle information transmission routine shown as a flowchart in FIG. 10 at intervals of a predetermined time.

Accordingly, upon the arrival of each of predetermined timings, the second CPU determines whether or not the administrative server 20 has received the request for acquisition transmitted from the vehicle 30.

If the administrative server 20 has not received the request for acquisition, the second CPU determines in step 1005 that the result of determination is "No", and proceeds to step 1095 to temporarily end the present routine.

On the other hand, if the administrative server 20 has received the request for acquisition, the second CPU determines in step 1005 that the result of determination is "Yes", and carries out steps 1010 to 1020 in this sequence. After that, the second CPU temporarily ends the present routine.

In step 1010, the second CPU updates the vehicle information on the vehicle ID included in the request for acquisition received by the administrative server 20.

More specifically, the second CPU registers "the current position of the vehicle 30 included in the request for acquisition" as a vehicle position in a record where the vehicle ID in the vehicle information shown in FIG. 2 coincides with "the vehicle ID included in the request for acquisition", registers "the driving manner score S of the vehicle 30 included in the request for acquisition" as a driving manner score, and registers "the type of the vehicle 30 included in the request for acquisition" as vehicle type information. Furthermore, the second CPU registers the traveling direction specified based on the last current position of the vehicle 30 and the current position of the vehicle 30 included in the request for acquisition, as this vehicle type information.

In step 1015, the second CPU refers to the vehicle information shown in FIG. 2, and specifies the vehicle ID as to which the vehicle position is included in "a predetermined range from the current position of the vehicle 30 included in the request for acquisition" as a different vehicle ID.

In step 1020, the second CPU acquires a current position, a driving manner score, and vehicle type information (type and traveling direction) of the different vehicle from the vehicle information shown in FIG. 2, and transmits different vehicle information including these pieces of information to the vehicle 30 that has transmitted the request for acquisition, as a response to the request for acquisition.

⟨Peripheral Screen Display Routine⟩

Figure 11:
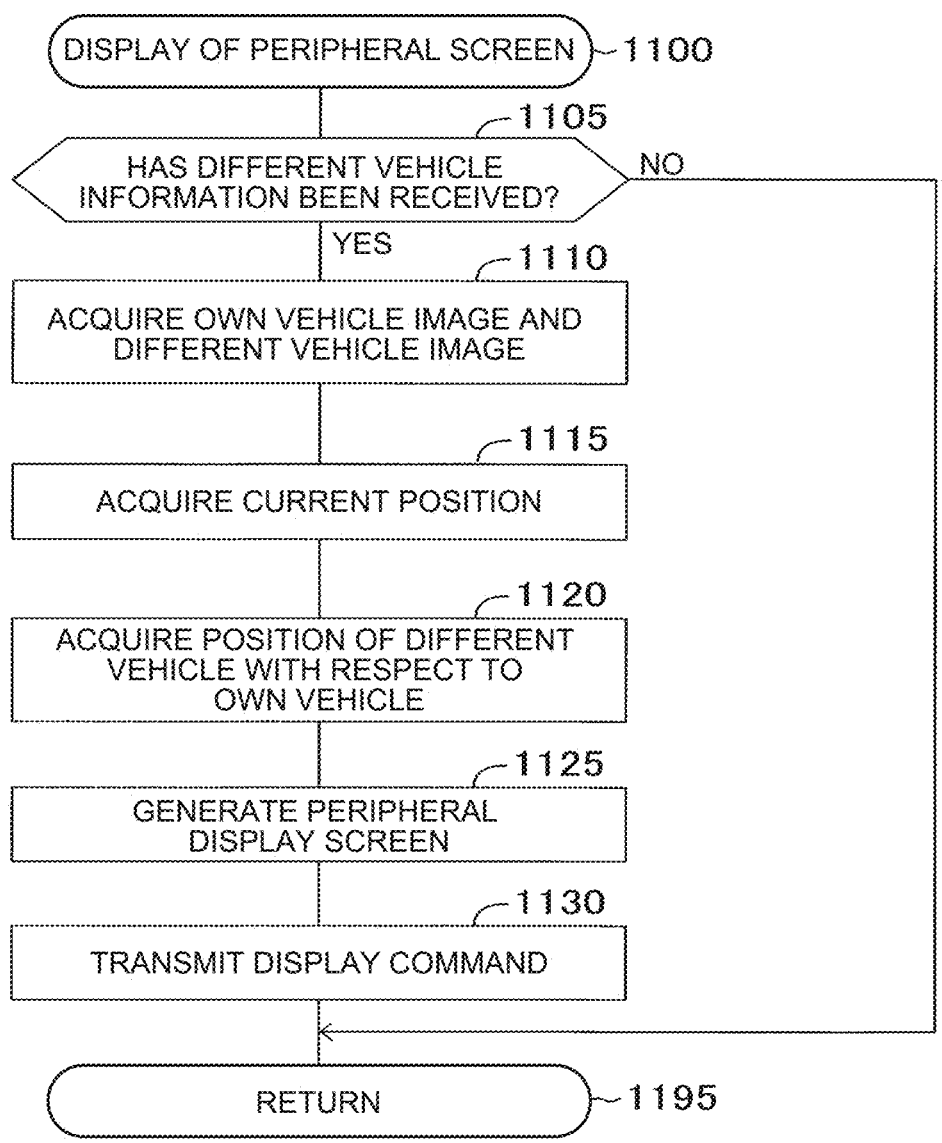
FIG. 11 is a flowchart showing a peripheral screen display routine that is executed by the CPU of the control ECU shown in FIG. 3.

The first CPU executes a peripheral screen display routine shown as a flowchart in FIG. 11, at intervals of a predetermined time.

Accordingly, upon the arrival of each of predetermined timings, the first CPU starts the process from step 1100 of FIG. 11, and proceeds to step 1105. In step 1105, the first CPU determines whether or not the vehicle 30 has received the different vehicle information from the administrative server 20. If the vehicle 30 has not received the different vehicle information, the first CPU determines in step 1105 that the result of determination is "No", and proceeds to step 1195 to temporarily end the present routine.

On the other hand, if the vehicle 30 has received the different vehicle information, the first CPU determines in step 1105 that the result of determination is "Yes", and carries out steps 1110 to 1130 in this sequence. After that, the first CPU proceeds to step 1195 to temporarily end the present routine.

In step 1110, the first CPU reads out the three-dimensional image (the own vehicle image 510) of the vehicle 30 (the own vehicle 30) and the three-dimensional images (the different vehicle images 530a and 530b) corresponding to the vehicle type information (the type of the vehicle) included in the different vehicle information from the ROM.

In step 1115, the first CPU acquires the current position of the own vehicle 30 based on the GNSS signal.

In step 1120, the first CPU acquires positions of the different vehicles with respect to the own vehicle 30, based on the current positions of the different vehicles included in the different vehicle information and the current position of the own vehicle 30.

In step 1125, the first CPU generates the peripheral screen 500 by arranging the different vehicle images (530a and 530b) with respect to the own vehicle image 510 based on the positions of the different vehicles with respect to the own vehicle 30 and the traveling directions of the different vehicles with respect to the own vehicle 30, and arranging the manner images (540a and 540b) in such a manner as to correspond to the different vehicle images respectively. Incidentally, the traveling directions of the different vehicles with respect to the own vehicle are acquired based on the traveling directions in the type information of the different vehicle information and the traveling direction of the own vehicle. When the traveling directions of the different vehicles are the same as the traveling direction of the own vehicle 30, the longitudinal directions of the different vehicle images are the same as the longitudinal direction of the own vehicle 30. When the traveling directions of the different vehicles are opposite the traveling direction of the own vehicle 30, the longitudinal directions of the different vehicle images are opposite the longitudinal direction of the own vehicle 30 (the different vehicle images are images representing oncoming vehicles).

In step 1130, the first CPU transmits a display command including the peripheral screen 500 to the display device 60.

Upon receiving the display command, the display device 60 displays the peripheral screen 500 included in the display command.

Owing to the foregoing, the peripheral screen 500 shown in FIG. 5 is displayed by the display device 60. Thus, the driver of the vehicle 30 can grasp the positions of the different vehicles with respect to the own vehicle and the driving manner scores of the different vehicles by visually recognizing the peripheral screen 500.

The disclosure is not limited to the foregoing embodiment, and various modification examples can be adopted within the scope of the disclosure.

First Modification Example

The first CPU of the present modification example executes the third manner score acquisition subroutine only in a period to the lapse of a predetermined time from a time point when the vehicle 30 acts based on a predetermined appreciation deserving behavior. The appreciation deserving behavior is a behavior of the vehicle 30 that leads to the performance of an appreciative action by a third person. For example, the appreciation deserving behavior is a decelerating behavior of the vehicle 30 with a pedestrian and different vehicles 30 detected around the vehicle 30. For example, it is determined whether or not the behavior of the vehicle 30 is the decelerating behavior, based on the brake pedal operation amount BP.

Figure 12:
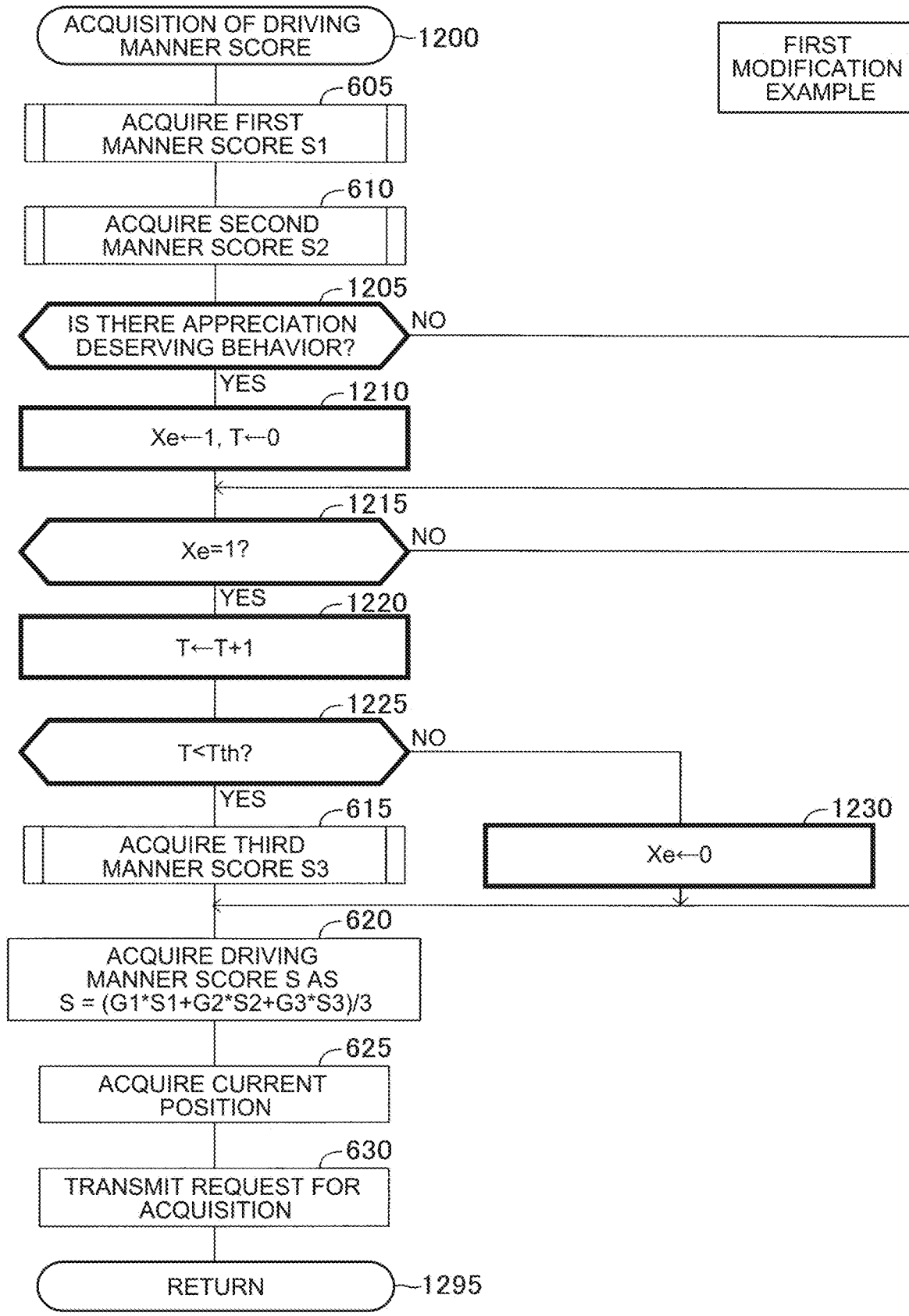
FIG. 12 is a flowchart showing a driving manner score acquisition routine that is executed by a CPU of a control ECU according to a first modification example of the embodiment.

The first CPU according to the present modification example executes a driving manner score acquisition routine shown in FIG. 12, instead of the driving manner score acquisition routine shown in FIG. 6. In the following description, steps identical in processing contents to the steps already mentioned will be accompanied by the same reference symbols as for the steps already mentioned respectively, and the description of these steps will be omitted as necessary.

Upon the arrival of each of predetermined timings, the first CPU starts the process from step 1200 shown in FIG. 12, carries out steps 605 and 610 shown in FIG. 12, and proceeds to step 1205. In step 1205, the first CPU determines whether or not the vehicle 30 has acted based on the appreciation deserving behavior.

If the vehicle 30 has acted based on the appreciation deserving behavior, the first CPU determines in step 1205 that the result of determination is "Yes", and carries out step 1210 and step 1215 in this sequence.

In step 1210, the first CPU sets the value of an appreciation flag Xe to "1", and sets the value of a timer T to "0".

The value of the appreciation flag Xe is set to "1" in the period to the lapse of the predetermined time from the timing when the vehicle 30 acts based on the appreciation deserving behavior, and is set to "0" upon the lapse of the predetermined time. The value of the appreciation flag Xe is set to "0" in an initial routine that is executed by the first CPU when the ignition key switch (not shown) of the vehicle 30 is changed from the off-position to the on-position.

The timer T is a timer for counting the time that has elapsed from the time point of the action of the vehicle 30 based on the appreciation deserving behavior.

In step 1215, the first CPU determines whether or not the value of the appreciation flag Xe is "1".

If the value of the appreciation flag Xe is "1", the first CPU determines in step 1215 that the result of determination is "Yes", and carries out step 1220 and step 1225 in this sequence.

In step 1220, the first CPU adds "1" to the value of the timer T.

In step 1225, the first CPU determines whether or not the value of the timer T is smaller than a predetermined threshold Tth.

If the value of the timer T is smaller than the threshold Tth, the first CPU determines in step 1225 that the result of determination is "Yes", and proceeds to step 615 shown in FIG. 12 to acquire the third manner score S3. After that, the first CPU carries out steps 620 to 630 shown in FIG. 12 in this sequence, and proceeds to step 1295 to temporarily end the present routine.

On the other hand, if the value of the timer T is equal to or larger than the threshold Tth, the first CPU determines in step 1225 that the result of determination is "No", sets the value of the appreciation flag Xe to "0", and proceeds to step 620 shown in FIG. 12.

If the value of the appreciation flag Xe is "0" when the first CPU proceeds to step 1215, the first CPU determines in step 1215 that the result of determination is "No", and proceeds to step 620 shown in FIG. 12 without carrying out step 615 shown in FIG. 12.

If the vehicle 30 has not acted based on the appreciation deserving behavior when the first CPU proceeds to step 1205, the first CPU determines in step 1205 that the result of determination is "No", and proceeds to step 1215.

Owing to the foregoing, the third manner score S3 is updated (acquired) in the period to the lapse of the predetermined time from the time point when the vehicle 30 acts based on the appreciation deserving behavior. The third manner score S3 is not updated (acquired) after the lapse of the predetermined time from the time point when the vehicle 30 acts based on the appreciation deserving behavior. Thus, the possibility of mistakenly determining that a third person has performed an appreciative action although the third person has not performed the appreciative action and mistakenly updating the third manner score S3 can be reduced. In consequence, the more accurate driving manner score S can be acquired.

Second Modification Example

On the peripheral screen 500 of the foregoing embodiment, the manner images 540 having the arrows indicating the different vehicle images 530 are displayed in the vicinity of the different vehicle images 530 respectively. On a peripheral screen 1300 of the present modification example shown in FIG. 13, each of a plurality of divisional regions obtained by dividing a region around the own vehicle 30A is displayed in a color corresponding to an average of the driving manner scores S of the different vehicles 30B to 30E located in each of the divisional regions.

More specifically, each of the regions is displayed in a color corresponding to the average of the driving manner scores of the different vehicles located in each of the regions. For example, the region with the average being equal to or larger than "0" and smaller than "30" is displayed in yellow (most darkly colored in FIG. 13), the region with the average being equal to or larger than "70" and equal to or smaller than "100" is displayed in blue (most lightly colored in FIG. 13), and the region with the average being equal to or larger than "30" and smaller than "70" is displayed in green (intermediately colored in FIG. 13).

The region around the own vehicle 30A is divided into divisional regions, namely, a front region FrA, a rear region RrA, a right region RA, and a left region LA. The different vehicle 30B is located in the front region FrA, the different vehicles 30C and 30D are located in the right region RA, and the different vehicle 30E is located in the rear region RrA. Since there is no different vehicle 30 located in the left region LA, the left region LA is not depicted in FIG. 13. On the peripheral screen 1300, a different vehicle image 530c is displayed as an image of the different vehicle 30D, and a different vehicle image 530d is displayed as an image of the different vehicle 30E.

The driving manner scores S of the different vehicles 30B to 30E are shown below.

The driving manner score S of the different vehicle 30B: 20

The driving manner score S of the different vehicle 30C: 60

The driving manner score S of the different vehicle 30D: 100

The driving manner score S of the different vehicle 30E: 50

Figure 13:
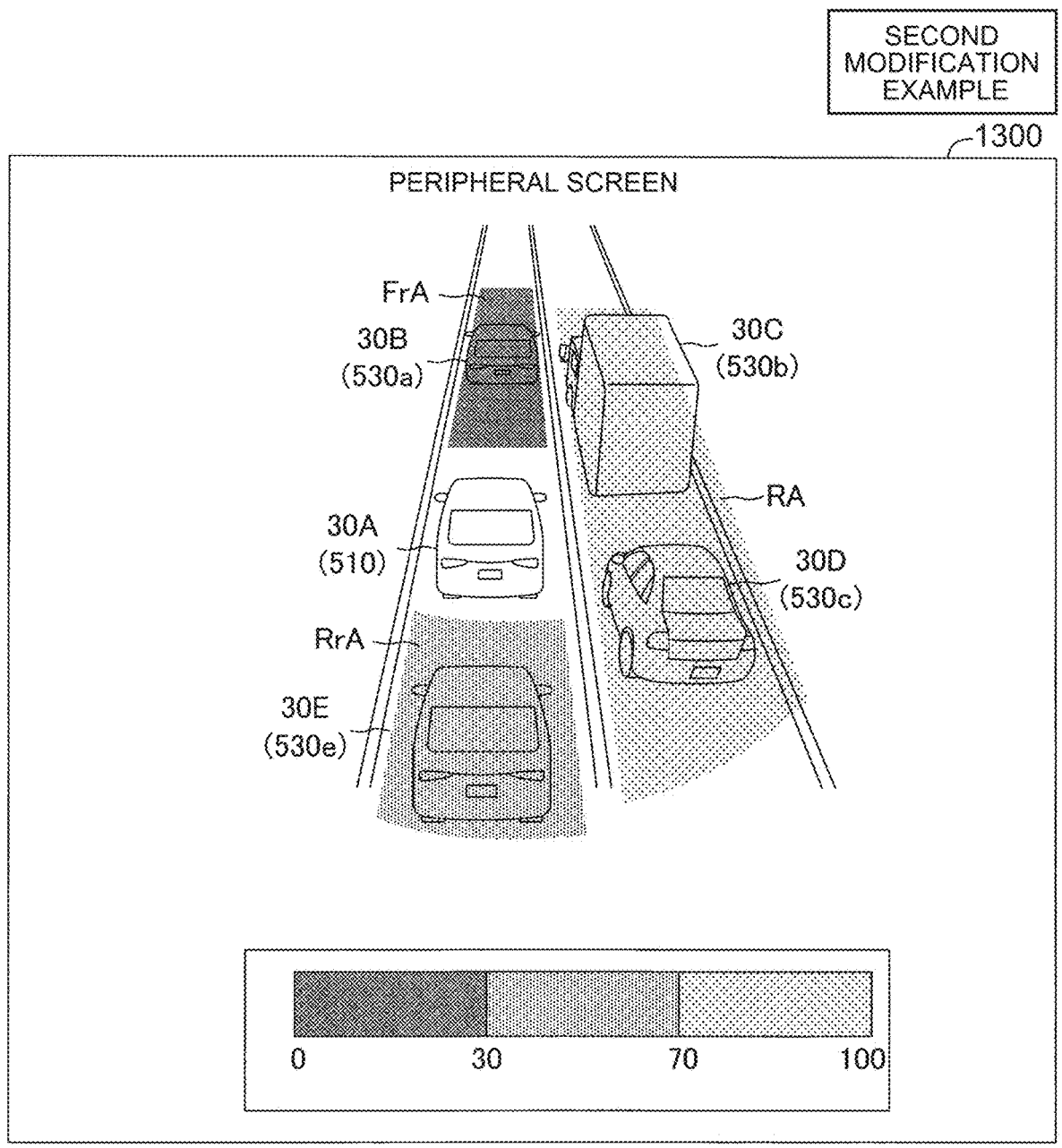
FIG. 13 is an illustrative view of a peripheral screen according to a second modification example of the embodiment.

The average of the driving manner scores S in the front region FrA is "20", so the front region FrA is displayed in yellow (most darkly colored in FIG. 13). The average of the driving manner scores S in the right region RA is "80", so the right region RA is displayed in blue (most lightly colored in FIG. 13). The average of the driving manner scores S in the rear region RrA is "50", so the rear region RrA is displayed in green (intermediately colored in FIG. 13).

Thus, the driver of the own vehicle 30 can grasp the average of the driving manner scores S in each of the regions by merely looking at the color of each of the regions on the peripheral screen 1300. Furthermore, since the numerical values of the driving manner scores S of the different vehicles are not displayed, the driver of the own vehicle 30 is unable to specify the numerical values of the driving manner scores S of the different vehicles 30.

Figure 14:
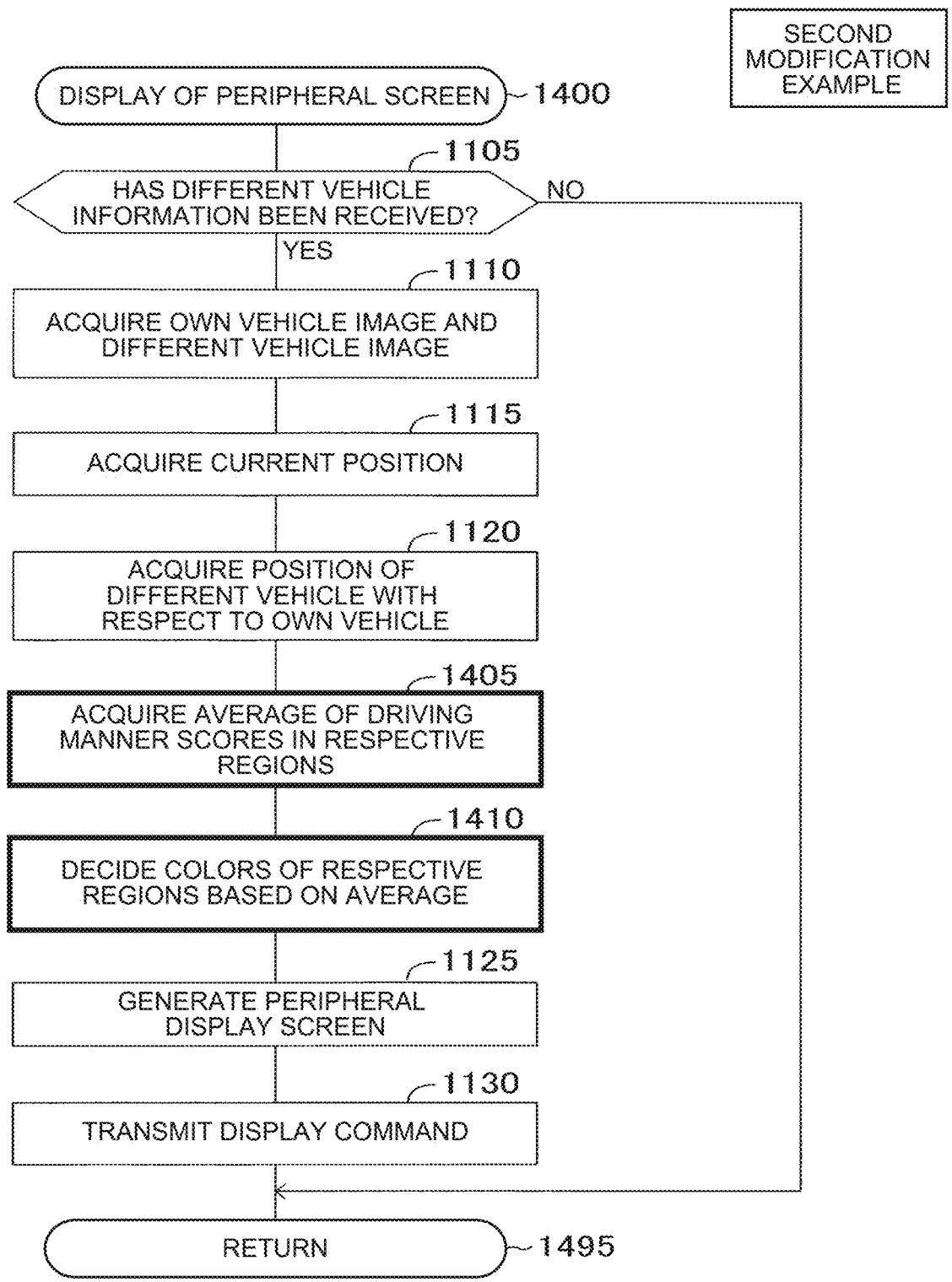
FIG. 14 is a flowchart showing a peripheral screen display routine that is executed by a CPU of a control routine according to the second modification example of the embodiment.

The first CPU according to the present modification example executes a peripheral screen display routine shown in FIG. 14 instead of the peripheral screen display routine shown in FIG. 11. In the following description, steps identical in processing contents to the steps already mentioned will be accompanied by the same reference symbols as for the steps already mentioned respectively, and the description of these steps will be omitted as necessary.

Upon the arrival of each of predetermined timings, the first CPU starts the process from step 1400 shown in FIG. 14, and proceeds to step S1105 shown in FIG. 14. If it is determined in step 1105 shown in FIG. 14 that the result of determination is "Yes", the first CPU carries out steps 1110 and 1120 shown in FIG. 14 in this sequence. After that, the first CPU carries out step 1405 and step 1410 in this sequence.

In step 1405, the first CPU acquires the averages of the driving manner scores S of the different vehicles 30 located in the front region FrA, the rear region RrA, the right region RA, and the left region LA respectively.

In step 1410, the first CPU decides the colors of the front region FrA, the rear region RrA, the right region RA, and the left region LA, based on the averages of the driving manner scores S in the front region FrA, the rear region RrA, the right region RA, and the left region LA respectively.

After that, the first CPU carries out steps 1125 and 1130 shown in FIG. 14 in this sequence, and proceeds to step 1495 to temporarily end the present routine.

Third Modification Example

On the peripheral screen 500 of the present modification example, the manner image 540 of each of the different vehicles 30 with the driving manner score S being equal to or larger than the predetermined threshold Sth is displayed, and the manner image 540 of each of the different vehicles 30 with the driving manner score S being smaller than the threshold Sth is not displayed.

Figure 15:
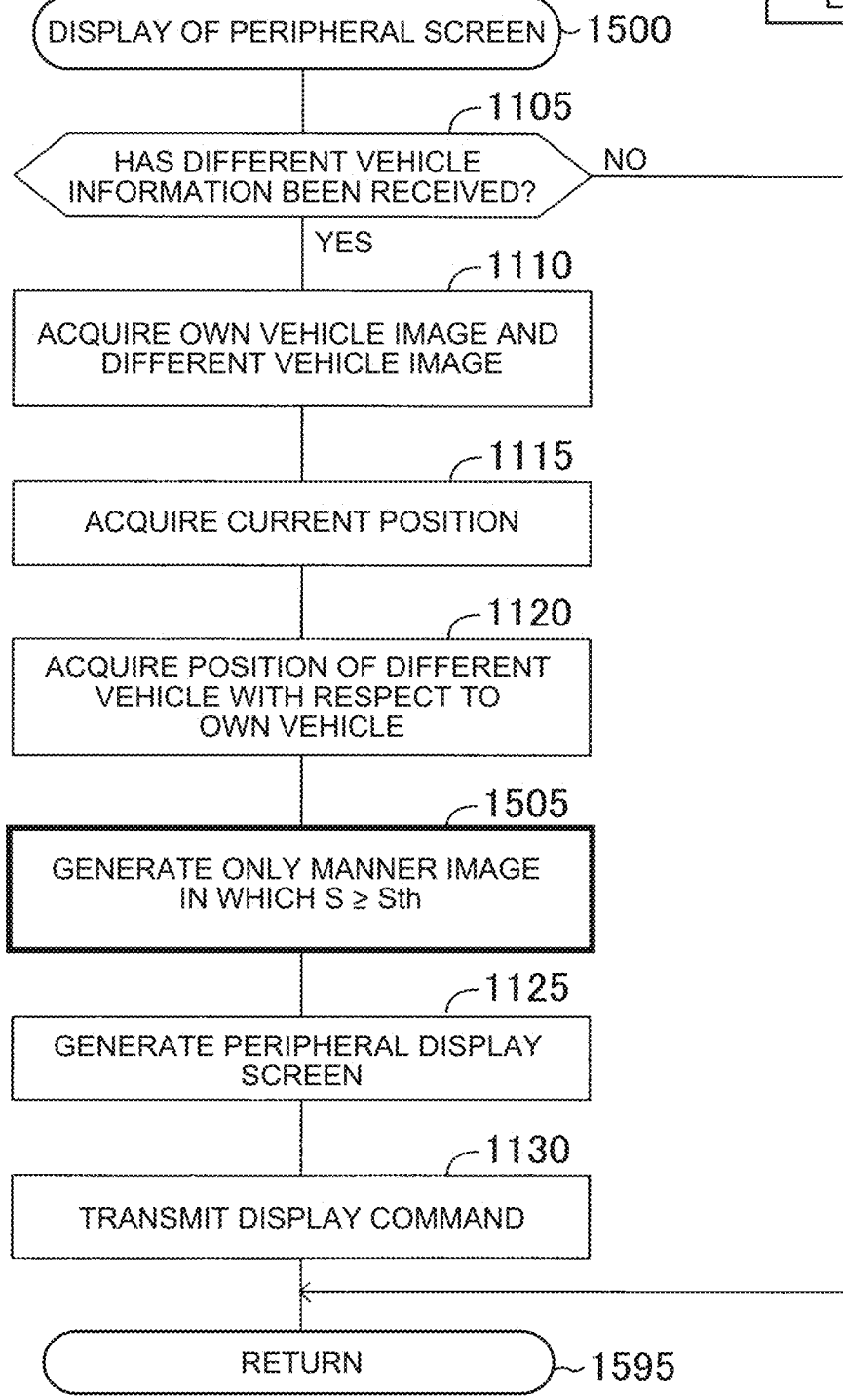
FIG. 15 is a flowchart showing a peripheral screen display routine that is executed by a CPU of a control ECU according to a third modification example of the embodiment.

The first CPU according to the present modification example executes a peripheral screen display routine shown in FIG. 15 instead of the peripheral screen display routine shown in FIG. 11. In the following description, steps identical in processing contents to the steps already mentioned will be accompanied by the same reference symbols as for the steps already mentioned respectively, and the description of these steps will be omitted as necessary.

Upon the arrival of each of predetermined timings, the first CPU starts the process from step 1500 shown in FIG. 15, and proceeds to step 1105 shown in FIG. 15. If it is determined in step 1105 shown in FIG. 15 that the result of determination is "Yes", the first CPU carries out steps 1110 to 1120 shown in FIG. 15 in this sequence, and proceeds to step 1505.

In step 1505, the first CPU generates the manner image 540 with the driving manner score S being equal to or larger than the threshold Sth. Incidentally, in step 1505, the first CPU does not generate any manner image 540 with the driving manner score S being smaller than the threshold Sth.

After that, the first CPU carries out steps 1125 and 1130 shown in FIG. 15 in this sequence, and proceeds to step 1595 to temporarily end the present routine. The first CPU determines in step 1105 shown in FIG. 15 that the result of determination is "No", and proceeds to step 1595 to temporarily end the present routine.

Thus, the driving manner scores S smaller than the threshold Sth are not displayed on the peripheral screen 500. Therefore, it is impossible to specify the exact values of the driving manner scores S smaller than the threshold Sth.

Fourth Modification Example

In the present modification example, the own vehicle 30 directly receives vehicle information from the different vehicles 30 without the intermediary of the administrative server 20, and displays the peripheral screen 500 based on the vehicle information.

Figure 16:
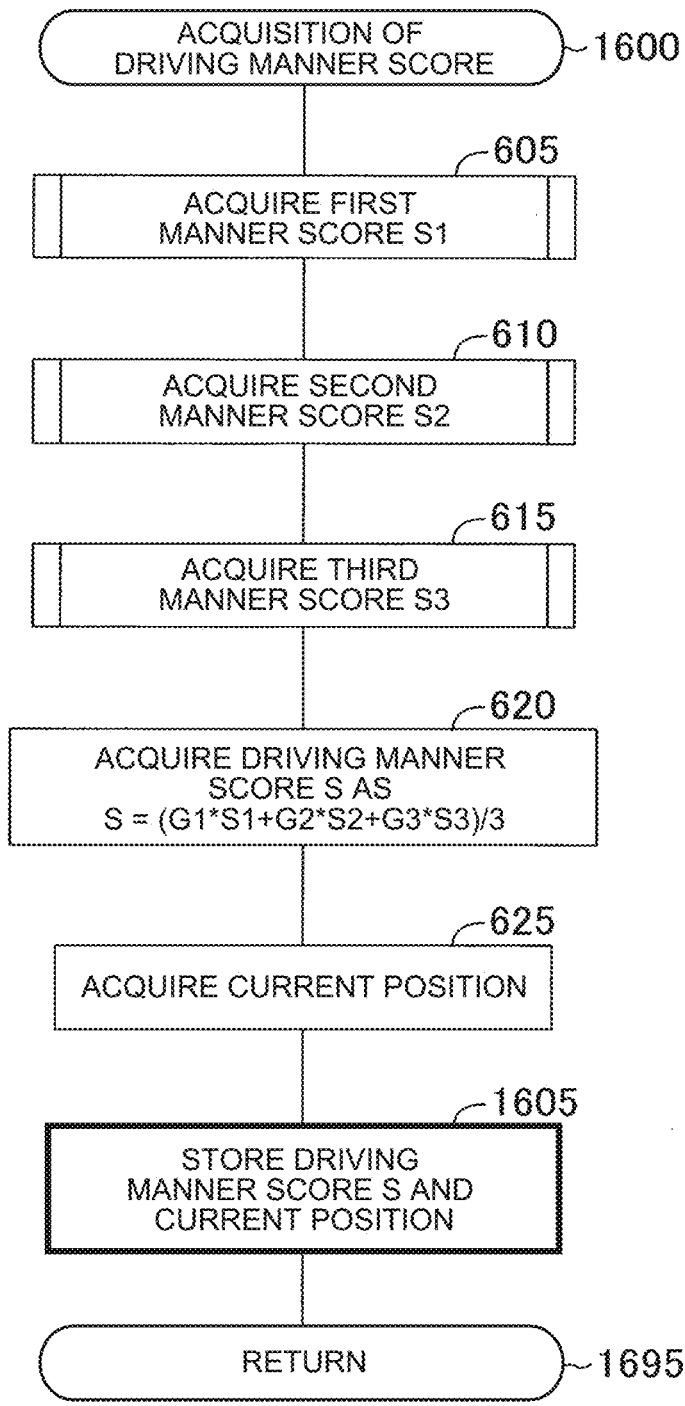
FIG. 16 is a flowchart showing a driving manner score acquisition routine that is executed by a CPU of a control ECU according to a fourth modification example of the embodiment.

The first CPU according to the present modification example executes a driving manner score acquisition routine shown in FIG. 16 instead of the driving manner score acquisition routine shown in FIG. 6. The first CPU executes a vehicle information transmission routine shown in FIG. 17. Furthermore, the first CPU executes a peripheral screen display routine shown in FIG. 18 instead of the peripheral screen display routine shown in FIG. 11. Incidentally, since the present modification example does not necessitate the administrative server 20, the different vehicle information transmission routine shown in FIG. 10 is not executed. In the following description, steps identical in processing contents to the steps already mentioned will be accompanied by the same reference symbols as for the steps already mentioned respectively, and the description of these steps will be omitted as necessary.

⟨Driving Manner Score Acquisition Routine⟩

Upon the arrival of each of predetermined timings, the first CPU starts the process from step 1600 shown in FIG. 16, carries out steps 605 to 625 shown in FIG. 16 in this sequence, and proceeds to step 1605.

In step 1605, the first CPU stores the driving manner score S acquired in step 620 shown in FIG. 16 and the current position acquired in step 625 shown in FIG. 16 into the RAM.

After that, the first CPU proceeds to step 1695 to temporarily end the present routine.

⟨Vehicle Information Transmission Routine⟩

Figure 17:
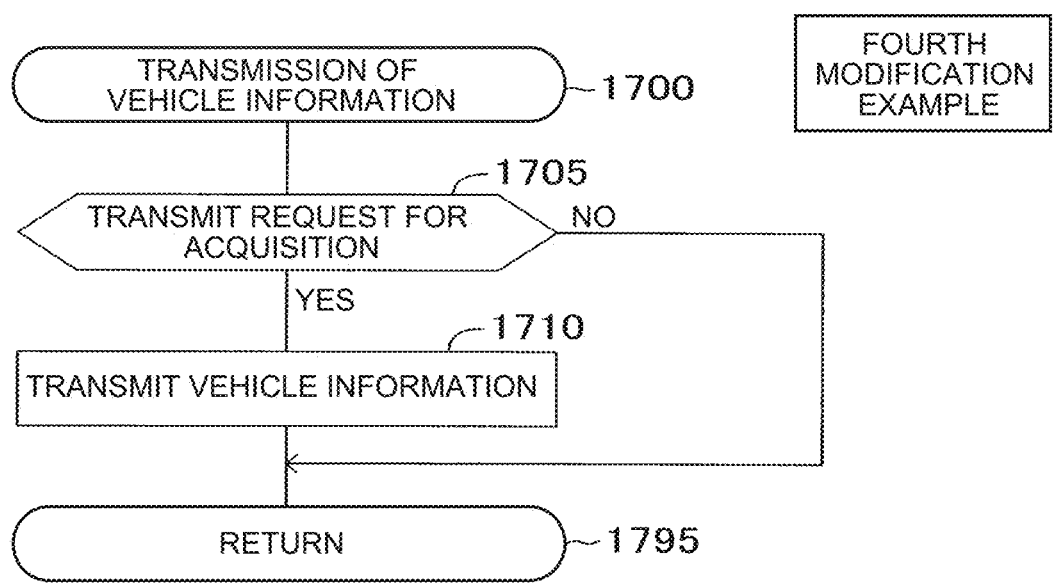
FIG. 17 is a flowchart showing a vehicle information transmission routine that is executed by the CPU of the control ECU according to the fourth modification example of the embodiment.

The first CPU executes a vehicle information transmission routine shown as a flowchart in FIG. 17 at intervals of a predetermined time.

Accordingly, upon the arrival of each of predetermined timings, the first CPU starts the process from step 1700 of FIG. 17, and proceeds to step 1705. In step 1705, the first CPU determines whether or not the vehicle-to-vehicle communication device 72 of the vehicle 30 has received a request for acquisition from the different vehicle 30.

Incidentally, the first CPU of each of the own vehicle 30 and the different vehicle 30 transmits a request for acquisition that is a request for acquiring vehicle information from the different vehicle 30, from the vehicle-to-vehicle communication device 72, at intervals of a predetermined time. Furthermore, in transmitting the request for acquisition, the first CPU stores a request ID that is an identifier of the request for acquisition and a time of transmission of the request for acquisition into the RAM in association with each other.

If the vehicle-to-vehicle communication device 72 has received the request for acquisition, the first CPU determines in step 1705 that the result of determination is "Yes", and carries out step 1710.

In step 1710, the first CPU transmits vehicle information including the driving manner score S, the current position of the vehicle 30, and vehicle type information (type and traveling direction) that are stored in the RAM, via the vehicle-to-vehicle communication device 72. Furthermore, this vehicle information includes the request ID of the request for acquisition.

Incidentally, the traveling direction is an orientation that is acquired based on the history of the absolute position of the vehicle 30. After that, the first CPU proceeds to step 1795 to temporarily end the present routine.

If the vehicle-to-vehicle communication device 72 has not received the request for acquisition, the first CPU determines in step 1705 that the result of determination is "No", and proceeds to step 1795 to temporarily end the present routine.

⟨Peripheral Screen Display Routine⟨

Upon the arrival of each of predetermined timings, the first CPU starts the process from step 1800 shown in FIG. 18, and proceeds to step 1805. In step 1805, the first CPU determines whether or not the vehicle-to-vehicle communication device 72 has received vehicle information.

If the vehicle-to-vehicle communication device 72 has received vehicle information, the first CPU determines in step 1805 that the result of determination is "Yes", and proceeds to step 1810. In step 1810, the first CPU specifies a relative distance L from the vehicle 30 to the vehicle 30 to which the vehicle information has been transmitted, based on a transmission/reception time that is a time from the transmission of a request for acquisition to the reception of the vehicle information. More specifically, the first CPU specifies the transmission/reception time based on a time point of transmission corresponding to the request ID included in the vehicle information and a time point of reception of the vehicle information.

After that, the first CPU carries out steps 1110 to 1130 shown in FIG. 18 in this sequence, and proceeds to step 1895 to temporarily end the present routine.

If the vehicle-to-vehicle communication device 72 has not received the vehicle information, the first CPU determines in step 1805 that the result of determination is "No", and proceeds to step 1895 to temporarily end the present routine.

Fifth Modification Example

In the foregoing embodiment and modification examples, the different vehicle images corresponding to the types of the different vehicles 30 prepared in advance are displayed on the peripheral screen 500 (1300). However, images photographed by cameras that are disposed on the vehicle 30 to photograph an area around the vehicle 30 may be displayed on the peripheral screen 500.

In this case, a rear camera for photographing an area behind the vehicle 30, a right camera for photographing an area to the right of the vehicle 30, and a left camera for photographing an area to the left of the vehicle 30 as well as a front camera (the off-vehicle camera 44) for photographing an area in front of the vehicle 30 are disposed on the vehicle 30. The first CPU generates a peripheral image by synthesizing camera images photographed by the front camera, the rear camera, the right camera, and the left camera. When there is at least one different vehicle 30 around the vehicle 30, an image of the different vehicle 30 is included in the peripheral image. The first CPU displays the manner image 540 in such a manner as to correspond to the position of the image of the different vehicle 30 in the peripheral image.

Sixth Modification Example

The display control system 10 may include "a vehicle to which the display control apparatus 35 that acquires the driving manner score of the different vehicle 30 without acquiring the own driving manner score S and that displays the peripheral screen 500 is applied".

Seventh Modification Example

In step 710, the first CPU specifies the driver ID based on the driver seat image. However, the first CPU may specify the driver ID from at least one of a smartphone or wearable terminal carried by the driver, the driver's fingerprints, the driver's driving license, and the like.

Eighth Modification Example

In the foregoing embodiment, the administrative server 20 updates the vehicle information (see step 1010 shown in FIG. 10) upon receiving the request for acquisition, and transmits the different vehicle information (see step 1020 shown in FIG. 10), but the disclosure is not limited thereto. In step 630 shown in FIG. 6, the vehicle 30 transmits a request for update including the vehicle ID, the current position of the vehicle 30, the driving manner score S, and the vehicle type to the administrative server 20. The administrative server 20 updates the vehicle information upon receiving the request for update. Furthermore, the vehicle 30 transmits a request for acquisition to the administrative server 20 at a timing different from that of transmission of the request for update. This request for acquisition is only required to include the current position of the vehicle 30, and may not include the driving manner score S. Upon receiving this request for acquisition, the administrative server 20 transmits different vehicle information.

Ninth Modification Example

The programs of the second manner score acquisition subroutine and the third manner score acquisition subroutine may be updated by the administrative server 20. For example, due to this update, the manner distance Dmth used in step 825 shown in FIG. 8, the threshold used in making a determination on sudden braking in step 845 shown in FIG. 8, the predetermined time used in step 915 shown in FIG. 9, and the predetermined time used in step 930 shown in FIG. 9 may be changed.

Tenth Modification Example

Figure 10:
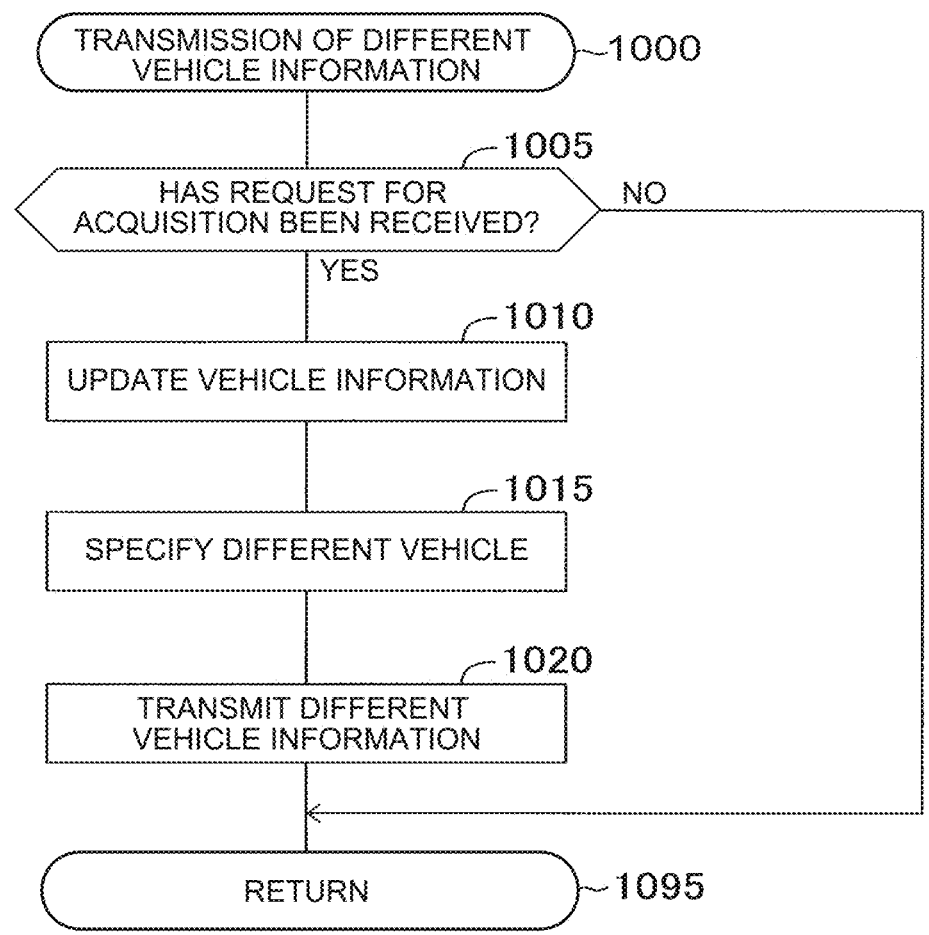
FIG. 10 is a flowchart showing a different vehicle information transmission routine that is executed by a CPU of the administrative server shown in FIG. 1.

The manner behavior of the vehicle 30 described with reference to FIG. 9 and the appreciative action by the third person described with reference to FIG. 10 are nothing more than examples, and the disclosure is not limited to the foregoing embodiment. For example, at least one of the manner behavior and the appreciative action may be changed through the foregoing update.

Eleventh Modification Example

In the foregoing embodiment, the manner image 540 of the different vehicle 30 has been described as being displayed in the vicinity of the different vehicle image 530. However, the manner image 540 may be displayed in such a manner as to be superimposed on the different vehicle image 530.

What is claimed is:

1. A vehicle display control apparatus comprising:
a display device arranged at a predetermined position of an own vehicle; and
a control unit configured to cause the display device to display a peripheral screen for presenting a driver of the own vehicle with a position of a different vehicle running around the own vehicle with respect to the own vehicle, wherein
the control unit is configured to
acquire the position of the different vehicle with respect to the own vehicle and a driving manner score as a numerical rating scale representing how good driving manners of the different vehicle are, and
cause the display device to display the driving manner score in such a manner as to correspond to the position of the different vehicle with respect to the own vehicle, on the peripheral screen,
the control unit is configured to acquire the driving manner score based on a history of driving by a driver of the different vehicle, a number of times of a predetermined manner behavior of the different vehicle, and a number of times of a predetermined appreciative action for the different vehicle by a third person, and
the history of driving by the driver of the different vehicle includes a driving frequency, a traffic accident history, and a traffic violation history.

2. The vehicle display control apparatus according to claim 1, wherein
the control unit is configured to
store the driving manner score in association with absolute positions of a plurality of vehicles,
transmit a request for acquisition including a current absolute position of the own vehicle to an administrative server that is connected to the vehicle display control apparatus via a network in such a manner as to enable exchange of data,
receive an absolute position of the different vehicle that is a vehicle located within a predetermined range of the current absolute position of the own vehicle and the driving manner score of the different vehicle from the administrative server, as a response to the request for acquisition, and
acquire the position of the different vehicle with respect to the own vehicle, based on the current absolute position of the own vehicle and the absolute position of the different vehicle.

3. The vehicle display control apparatus according to claim 1, wherein
the control unit is configured to
be able to exchange data with the different vehicle through vehicle-to-vehicle communication in response to a distance between the different vehicle and the own vehicle being shorter than a predetermined distance,
receive a current absolute position of the different vehicle and the driving manner score of the different vehicle from the different vehicle via the vehicle-to-vehicle communication, and
acquire the position of the different vehicle with respect to the own vehicle based on a current absolute position of the own vehicle and the current absolute position of the different vehicle.

4. The vehicle display control apparatus according to claim 1, wherein
the control unit is configured to cause the display device to
display the driving manner score on the peripheral screen in response to the driving manner score of the different vehicle being equal to or larger than a predetermined threshold, and
refrain from displaying the driving manner score on the peripheral screen in response to the driving manner score of the different vehicle being smaller than the threshold.

5. The vehicle display control apparatus according to claim 1, wherein
the control unit is configured to cause the display device to display the driving manner score of the different vehicle made to correspond to the position of the different vehicle with respect to the own vehicle, by displaying a color corresponding to the driving manner score of the different vehicle located in each of a plurality of divisional regions obtained by dividing a region around the own vehicle for each of the divisional regions on the peripheral screen.

6. A vehicle display control system comprising:
a first vehicle; and
an administrative server connected to the first vehicle via a network in such a manner as to enable exchange of data, wherein
the administrative server is configured to
   store absolute positions of a plurality of second vehicles and driving manner scores as numerical rating scales representing how good driving manners of the second vehicles are, in association with each other respectively, and
   transmit an absolute position of at least a different vehicle that is one of the second vehicles located around a current absolute position of the first vehicle and the driving manner score of the different vehicle, to the first vehicle, as a response to a request for acquisition including the current absolute position of the first vehicle, upon receiving the request for acquisition from the first vehicle, and
the first vehicle is configured to
   acquire a position of the different vehicle with respect to the first vehicle based on the current absolute position of the first vehicle and the absolute positions of the second vehicles, upon receiving the absolute positions of the second vehicles and the driving manner scores of the second vehicles, and
   display the driving manner scores of the second vehicles in such a manner as to correspond to the positions of the second vehicles with respect to the first vehicle, on a peripheral screen that is displayed by a display device of the first vehicle to present a driver of the first vehicle with the positions of the second vehicles with respect to the first vehicle,
the driving manner score of each of the second vehicles is determined based on a history of driving by a driver of said each second vehicle, a number of times of a predetermined manner behavior of said each second vehicle, and a number of times of a predetermined appreciative action for said each second vehicle by a third person, and
the history of driving by the driver of said each second vehicle includes a driving frequency, a traffic accident history, and a traffic violation history.

7. The vehicle display control apparatus according to claim 1, wherein
the driving manner score is defined as a first driving manner score, and
the control unit is configured to acquire a second driving manner score based on a manner distance counter.

8. The vehicle display control apparatus according to claim 7, wherein
the control unit is configured to determine a value of the manner distance counter by determining whether or not a vehicle-to-vehicle distance between the own vehicle and the different vehicle has remained equal to or longer than a manner distance maintaining state for a predetermined time.

9. The vehicle display control apparatus according to claim 7, wherein
the control unit is configured to acquire the second driving manner score further based on a manner stop counter.

10. The vehicle display control apparatus according to claim 9, wherein
the control unit is configured to determine a value of the manner stop counter by determining whether or not there is a time point when an amount of increase in a brake pedal operation amount per unit time in the different vehicle is equal to or larger than a predetermined amount.

* * * * *